United States Patent [19]

Jelinek

[11] Patent Number: 5,442,544
[45] Date of Patent: Aug. 15, 1995

[54] SINGLE INPUT SINGLE OUTPUT RATE OPTIMAL CONTROLLER

[75] Inventor: Jan Jelinek, Plymouth

[73] Assignee: Honeywell Inc., Minneapolis, Minn.

[21] Appl. No.: 334,895

[22] Filed: Nov. 4, 1994

Related U.S. Application Data

[63] Continuation of Ser. No. 814,307, Dec. 23, 1991, abandoned, which is a continuation-in-part of Ser. No. 471,189, Jan. 26, 1990, abandoned.

[51] Int. Cl.$^6$ .............................................. G06F 15/46
[52] U.S. Cl. .................... 364/149; 364/138; 364/153; 364/160; 364/165; 364/166
[58] Field of Search ................. 364/148–151, 364/160–163, 138, 166, 164–165, 152–153, 180

[56] References Cited

U.S. PATENT DOCUMENTS

| | | |
|---|---|---|
| 4,151,590 | 4/1979 | Azegami . |
| 4,370,706 | 1/1983 | Doniger et al. . |
| 4,418,381 | 11/1983 | Molusis et al. . |
| 4,437,045 | 3/1984 | Mitsuoka ........................ 364/150 |
| 4,504,905 | 3/1985 | Burrage . |
| 4,545,008 | 10/1985 | Sominin et al. . |
| 4,570,257 | 2/1986 | Olson et al. . |
| 4,587,605 | 5/1986 | Kouyama et al. . |
| 4,594,651 | 6/1986 | Jaswa et al. . |
| 4,639,853 | 1/1987 | Rake et al. ........................ 364/150 |
| 4,652,417 | 3/1987 | Sutherland et al. . |
| 4,679,136 | 7/1987 | Shigemasa ........................ 364/150 |
| 4,771,374 | 9/1988 | Ropelato . |
| 4,787,041 | 11/1988 | Yount . |
| 4,791,548 | 12/1988 | Yoshikawa et al. .............. 364/160 |
| 4,992,927 | 2/1991 | Araki ............................... 364/138 |

FOREIGN PATENT DOCUMENTS 0250105  10/1989  Japan ................................. 364/150

Primary Examiner—Roy N. Envall, Jr.
Assistant Examiner—Thomas E. Brown
Attorney, Agent, or Firm—Paul H. McDowall

[57] ABSTRACT

A nonlinear, time-variable digital controller and a general method for its synthesis. The processing of the reference load and the disturbance changes are kept totally separated. This benefits the designer because he can treat any control task as a pure tracking problem in which one unit is responsible for planning and synthesizing the controlled system's trajectory to move it into a desired state, and another unit takes care of possible deviations from the trajectory due to disturbance or load changes. Since the two units are independent, the designer is free to choose their characteristics arbitrarily.

18 Claims, 30 Drawing Sheets

STEP 1   PREDICT THE CURENT OUTPUT SEQUENCE $\left(\begin{array}{l}\text{ie. COMPUTE FUTURE VALUES OF}\\\text{THE CURRENT OUTPUT SEQUENCE}\end{array}\right)$

VIEW OF CURRENT CONTROL SEQUENCE, PLANT, FUTURE CURRENT OUTPUT AT TIME=K

| | K−d | (K−d)+1 | ... | K | K+1 | ... | K+P−1 | K+P+d |
|---|---|---|---|---|---|---|---|---|
| CURRENT COTROL SEQUENCE 301 | $u^o$(K−d) | $u^o$(K−d) | ... | $u^o$(K) | $u^o$(K+1) | ... | $u^o$(K+P−1) | |
| PLANT 302 | h | h | ... | h | h | ... | h | h |
| FUTURE CURRENT OUTPUT SEQUENCE 303 | 0 | 0 | ... | 0 | $y^o$(K+1) | ... | $y^o$(K+P−1) | $y^o$(K+P−d) |

Fig. 30

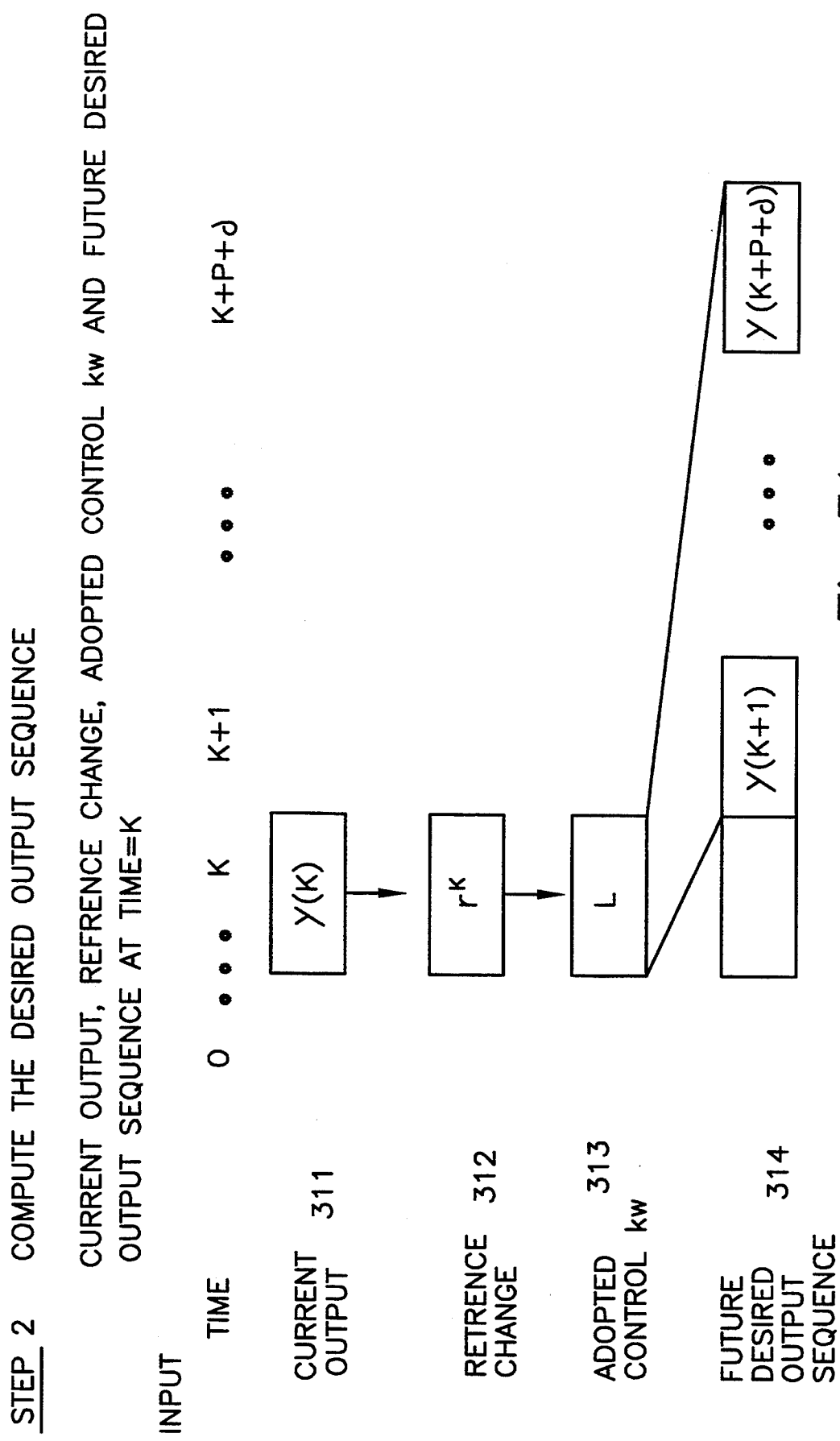

STEP 3 DETERMINE IDEAL CORRECTION OUTPUT SEQUENCE

FUTURE DESIRED OUTPUT SEQUENCE, FUTURE CURRENT OUTPUT SEQUENCE AND IDEAL CURRECTION OUTPUT

| | TIME | K+1 | ... | K+P+∂ | MATHMATICAL NATATION |
|---|---|---|---|---|---|
| FUTURE DESIRED OUTPIT SEQUENCE 314 (FROM STEP 2) | | y(K+1) | ... | y(K+P+∂) | Y(h) |
| FUTURE CURRENT OUTPUT SEQUENCE 303 (FROM STEP 1) | | y°(K+1) | ... | y°(K+P+∂) | Y°(h) |
| IDEAL CORRECTION OUTPUT 323 | | y(K+1)-y°(K+1) | ... | y°(K+P+∂)-y(K+P+∂) | y$^k$(h-K) |
| IDEAL CORRECTION 323 OUTPUT (AFTER NOTATION CHANGE) | | y(0) | ... | y(h) | y$^k$(h) |

Fig.32

STEP 5  FIND THE CORRECTION CONTROL SEQUENCE

| CORRECTION CONTROL SEQUENCE | 331 | CORRECTION CONTROL SEQUENCE | 301 | CORRECTION CONTROL SEQUENCE | 301 | MATHEMATICAL NOTATION |
|---|---|---|---|---|---|---|
| $u(0)$ | & | $u^K(1)$ | | $u(0)+u^K(1)$ | | $u^K(h)$ / $u^o(h-K)$ / $u(K+H)$ |
| ⋮ | | ⋮ | | ⋮ | | |
| $u(h)$ | & | $u^K(h-K)$ | | $u(h)+u^K(h-K)$ | | |

Fig. 34

SINGLE INPUT SINGLE OUTPUT RATE OPTIMAL CONTROLLER

This application is a continuation of application Ser. No. 07/814,307, filed Dec. 23, 1991, now abandoned, which is a continuation-in-part of application Ser. No. 07/471,189, filed Jan. 26, 1990, now abandoned.

This patent describes an invention related to system or process controllers.

BACKGROUND OF THE INVENTION commonly used conventional controllers, like PID controllers (which provide some combination of a proportional, integral and differential output), are typically 1 port controllers. This means that the controller uses a single control law which is applied to both the reference (set point) processing and the disturbance/load processing simultaneously. (The disturbance/load signal consists of the plant output signal as well as any disturbance.) If the reference and disturbance/load time profiles have different properties, as is almost always the case, the 1-port controller cannot be optimal. Because the 1 port controller mixes both the reference and the disturbance/load signals into one signal, the individual contributions from each cannot be determined.

The optimal solution can be found, not by trying to reconcile the two, but by treating each one individually. To accomplish this, a 2-port configuration is required, in which each signal is processed independent of the other, without any mutual interaction.

The invention relates to nonlinear, time-variable digital controllers and a method for their synthesis. Unlike conventional control systems, in which the processing of the reference load and the disturbance changes is carried out in the same unit, the cycling controllers herein keep them totally separated. This benefits the design because any control task can be treated as a pure tracking problem in which one unit is responsible for planning and synthesizing the controlled system's trajectory to move it into a desired state, and another unit takes care of possible deviations from the trajectory due to disturbances or load changes. Since the two units are independent, their characteristics can be chosen arbitrarily. This new functionality enables the design of control systems that surpass conventional systems in the quality of control.

To exemplify its use, the invention has been applied to developing a fixed-rate controller for electric utilities. In the fixed-rate mode the controller herein provides rate-optimal control of the controlled plant. The rate-optimal control produces the fastest plant response that never exceeds the user-specified rate. On the other hand, being the fastest implies that most of the time, the controller drives the plant at or near the maximum user-specified rate. As a result, in the fixed-rate mode the controller herein offers the maximum dynamic responsiveness of the plant without excessively stressing its components for any arbitrary set point or load change time profile.

In today's utility industry, the use of ever larger plants as spinning reserve capacity has made rapid response to large load swings a necessity. The issues of generation uncertainty caused by cogeneration and independent power producers and dwindling reserve capacity have magnified the load response problem. Larger daily load swings have also necessitated that plants be stable but very responsive. The industry also requires control solutions that not only can respond rapidly to load swings, but help minimize process upsets and oscillations of the process. Oscillations and large process upsets degrade the performance and reduce the life expectancy of a plant. Overall plant performance and the ability to optimize and feed back performance status to both the control system and the dispatcher will play an important role in the application of control technology in the power plant.

The power generation industry could realize significant benefits from this development which could potentially revolutionize the application of control to power plants to realize the following benefits:

Increased plant life and reduced component failures through true fixed rates of change based on critical stress levels.

Improved system frequency response through rapid control mode switching for fixed-duration, fixed-rate response.

Optimized response to dispatched load changes through response-based mode feedback to the dispatch center.

Improved heat rate through improved process stability and performance-based mode of control.

Improved process stability through fixed-rate control rather than through plant response feedback.

Minimized start-up cost with the start-up and shutdown mode of control.

More avenues for subloop improvements become available with the application of an advanced control technology as the foundation for plantwide control.

There is thus a trend toward developing larger manufacturing and production units because they provide higher efficiency. Controlling such units gives rise to problems not encountered with smaller systems. The energy that must be absorbed or released by the controlled system as a result of control actions is often so large that thermal, kinetic, torque, vibration and other stresses can easily damage the unit if the system state change is too rapid.

This issue is of prime importance to electric utilities. The current state-of-the-art hardware (for power plant control) is adequate to meet the needs fo the future. Only emphasis on the development of new control strategies and approaches is necessary to achieve improved performance.

SUMMARY OF THE INVENTION

A main object of the invention is the development of a next-generation controller. In addition to other features, the controller can be set to maintain the rate of change of the controlled parameters at a desired level. Instead of being hardwired into the controller at setup, the rate is a variable whose value can change continuously in run time according to user demands.

The present invention is unlike conventional controllers in at least two aspects. The first is the processing of the reference and the disturbance/load signals separately and independently. The second is the use of predictive control technology.

Separating the processing of the reference and the disturbance/load signals gives the present invention several advantages over traditional controllers. First, it allows the controller to operate in either a tightly coupled or distributed environment. Secondly, the control of the plant is superior because different control laws are allowed to dictate the processing of the reference and the disturbance/load signal.

Rate optimal predictive control of a linear single input-single output (SISO) plant is a nonlinear discrete control strategy. This strategy calls for the accumulation of corrective control sequences. At each sampling instant, a new corrective sequence is custom designed, according to a user defined control law, to optimally process the current set point or the load/disturbance change. This is then added to the existing control sequence. Although each element of the correction sequence is produced by linear control laws, their dependence on the history of the set point or disturbance/load dynamic time profiles make the overall predictive control strategy nonlinear.

In the Single Input Single Output Rate Optimal Controller (abbreviated SISO ROC), both of the controller's separated processing units use predictive control technology.

Other objects and advantages of the invention will become apparent from the following specification, appended claims and attached drawings.

Figure 3:
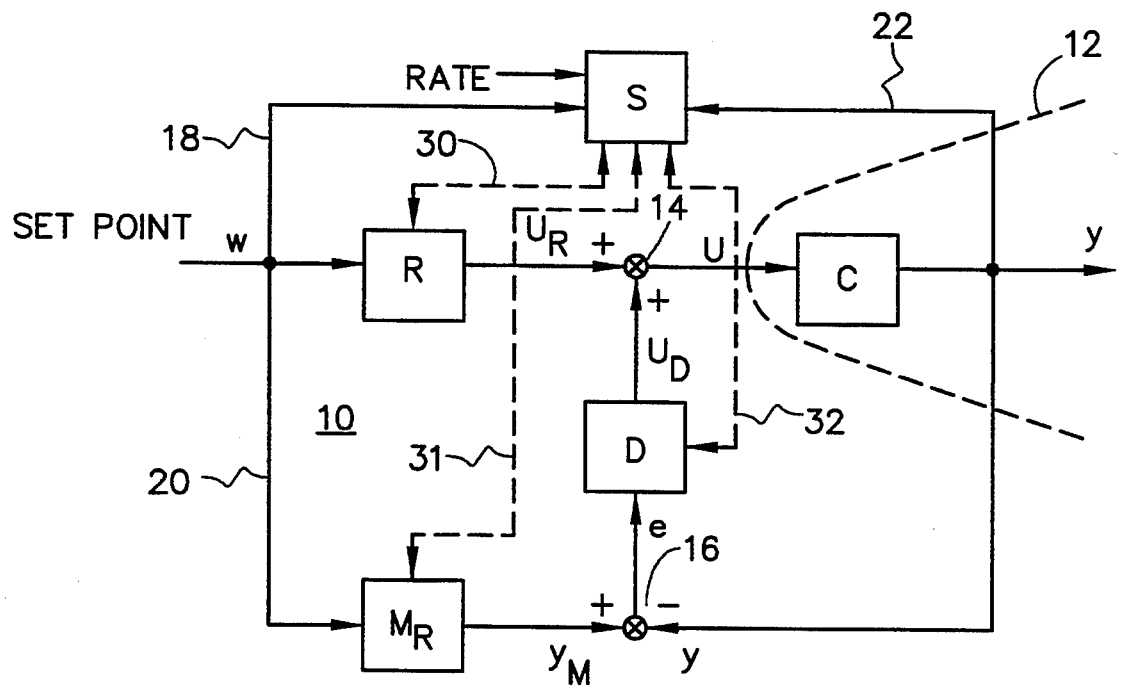
FIG. 3 shows a feedback control system in accordance with the invention that allows separate handling of reference and load/disturbance changes.
Figure 4:
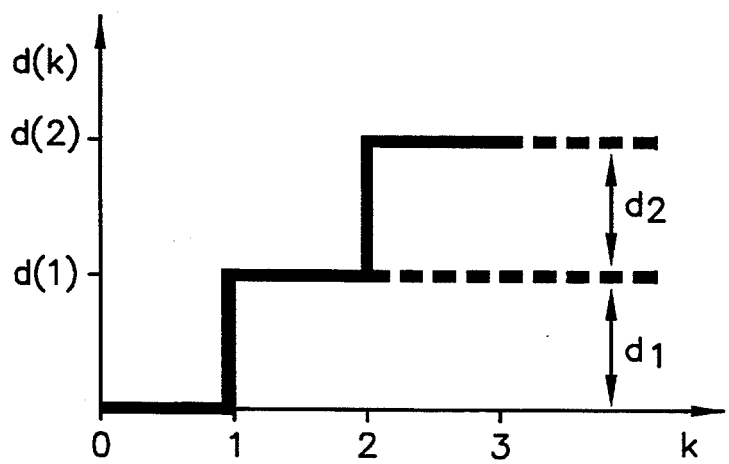
Figure 3A:
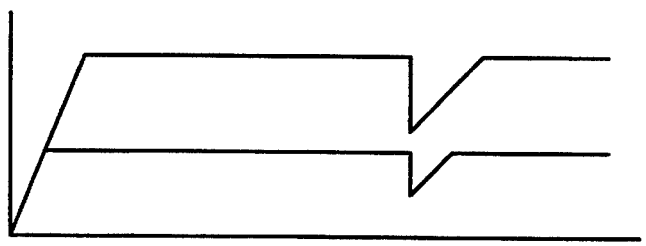
FIGS. 3A to 3D show idealized responses of the controller herein to set point and load disturbances for different configurations of the controller.
Figure 3B:
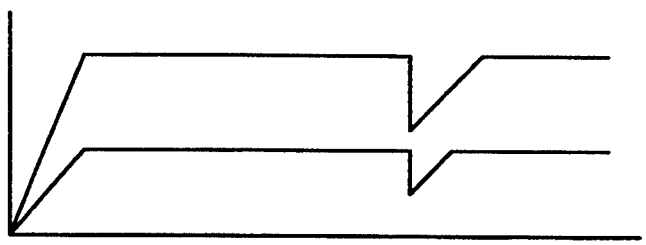
Figure 3C:
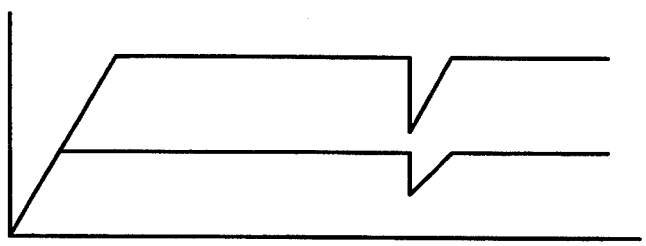
Figure 3D:
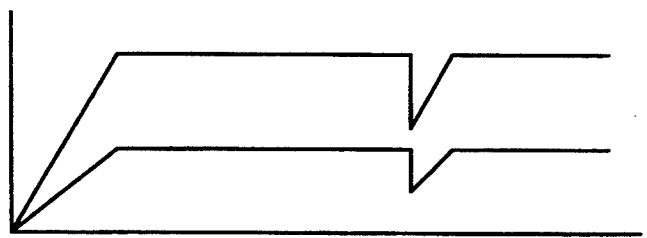
Figure 3P:
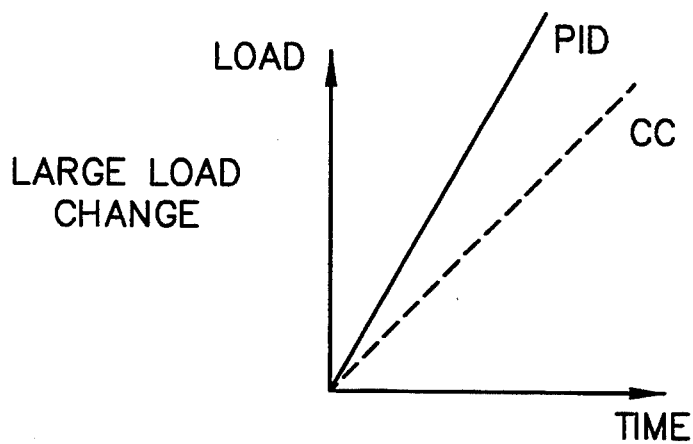
Figure 3Q:
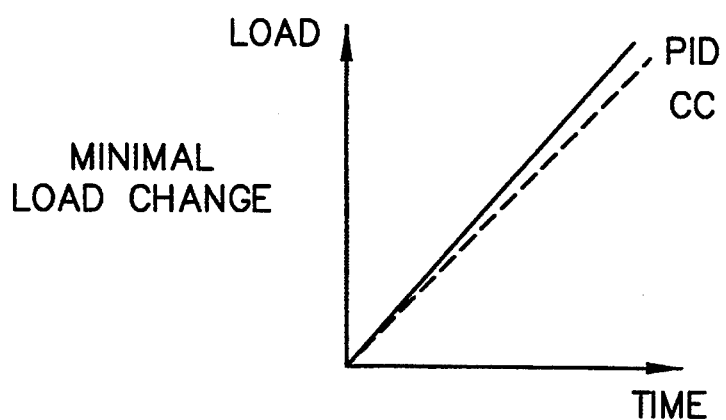
Figure 3R:
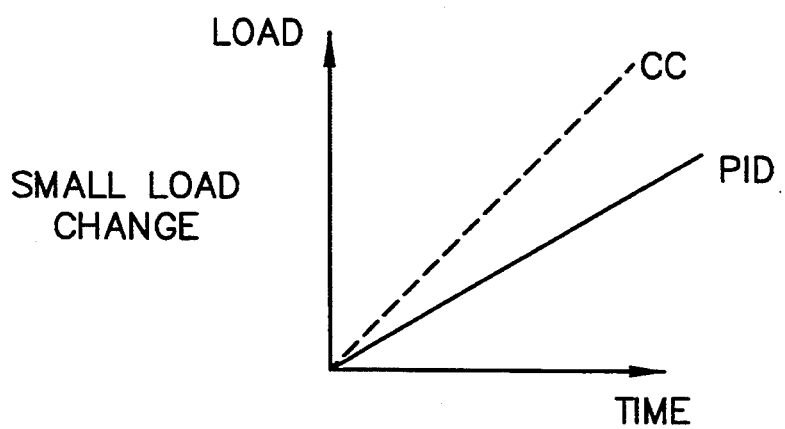
Figure 5:
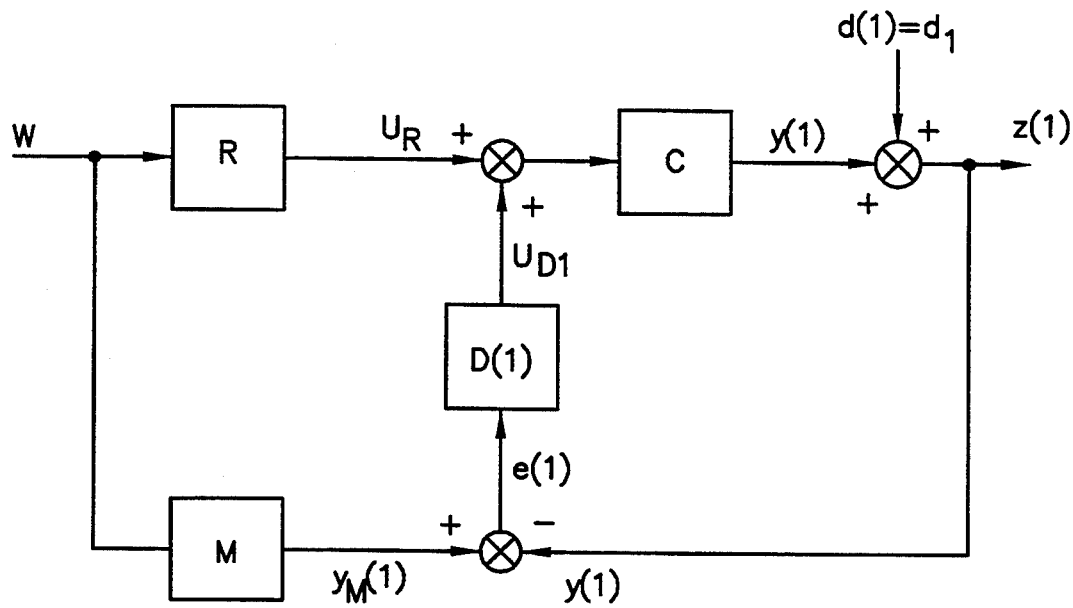
Figure 6:
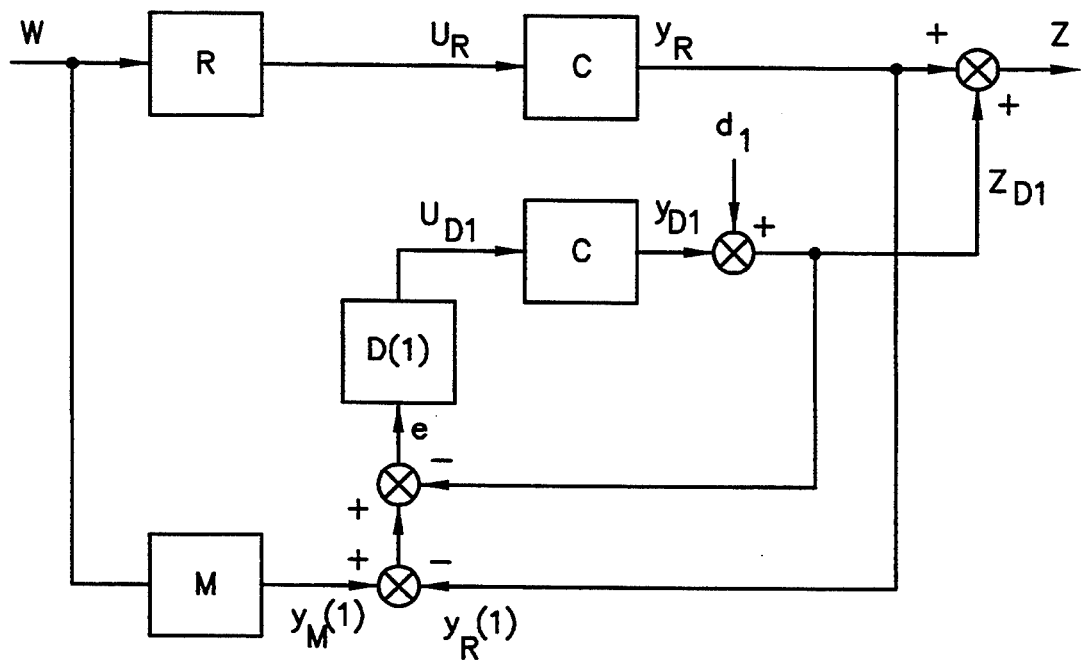
Figure 7:
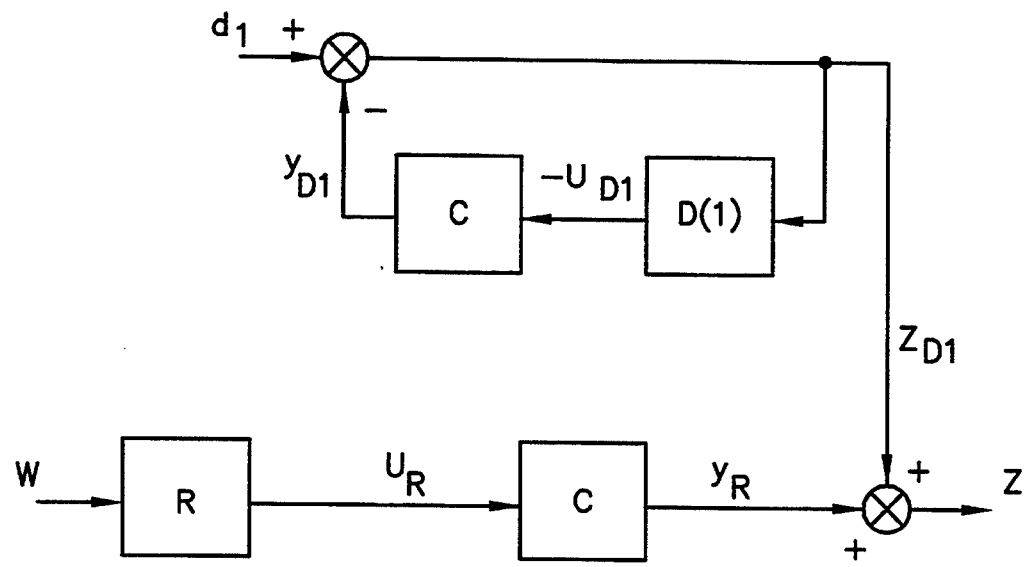

FIGS. 3P to 3R compare the rates of the PID controller and the controller herein for different load changes;

FIG. 4 shows a disturbance function viewed as composed of step functions;

FIG. 5 shows the control system of FIG. 3 at the instant $k=1$;

FIG. 6 shows a control system equivalent to the one in FIG. 5;

FIG. 7 shows another control system equivalent to the one in FIG. 5.

Figure 8:
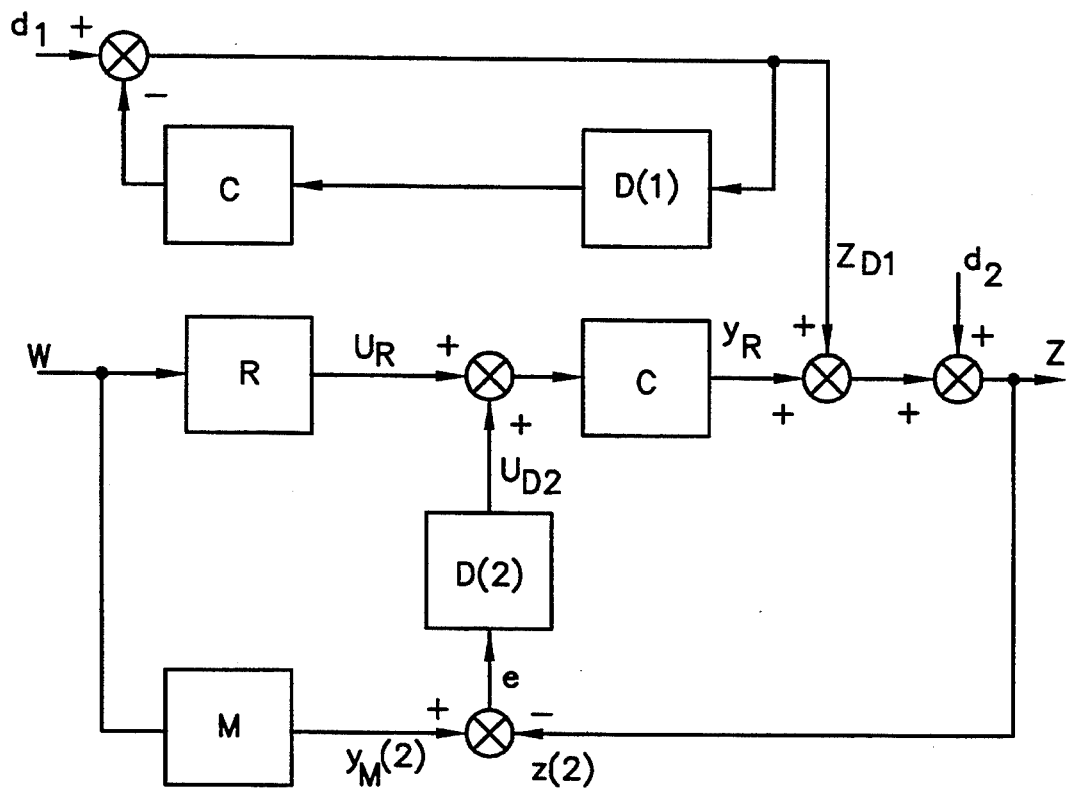
Figure 9:
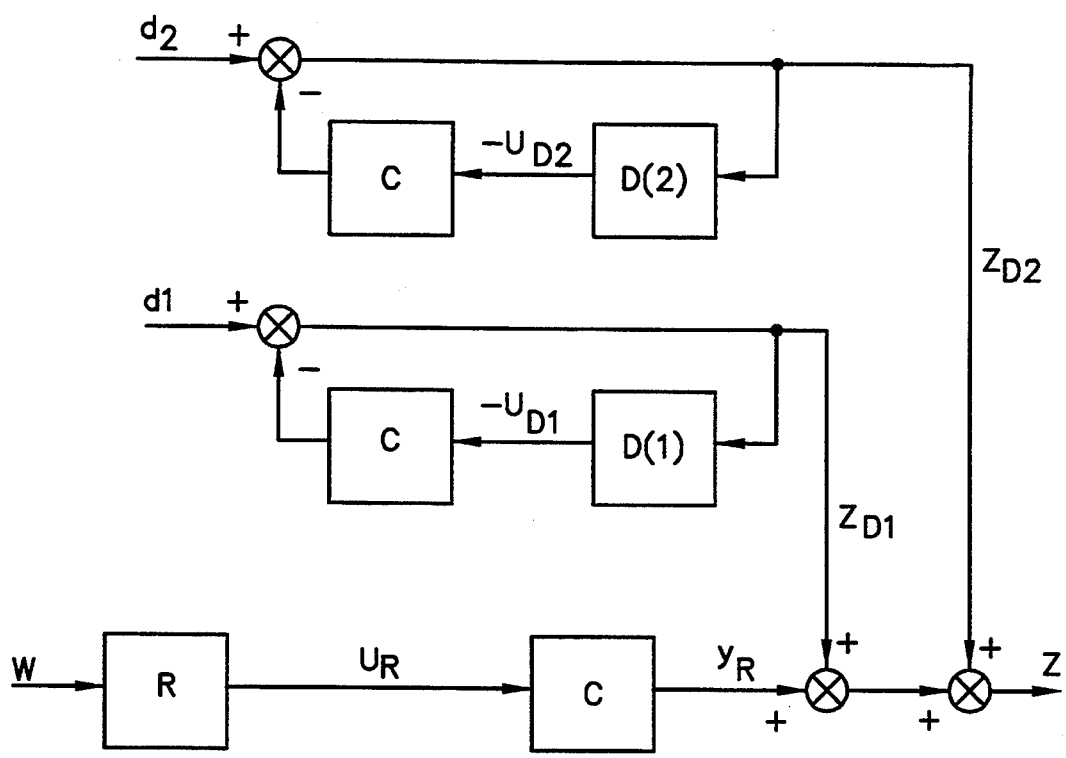
Figure 11A:
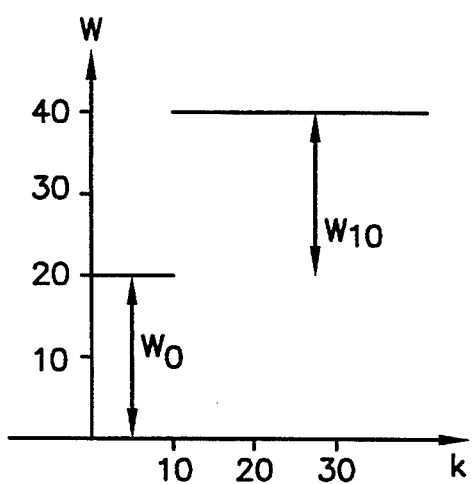
Figure 11B:
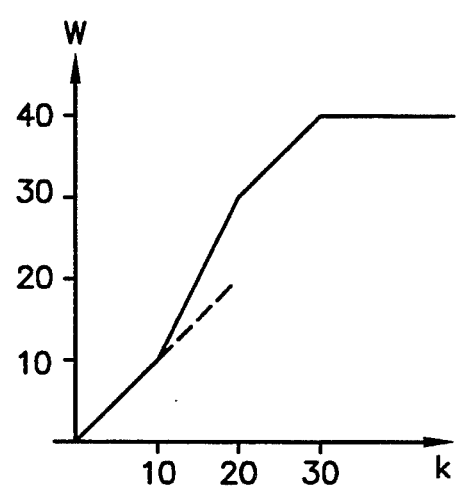
Figure 10:
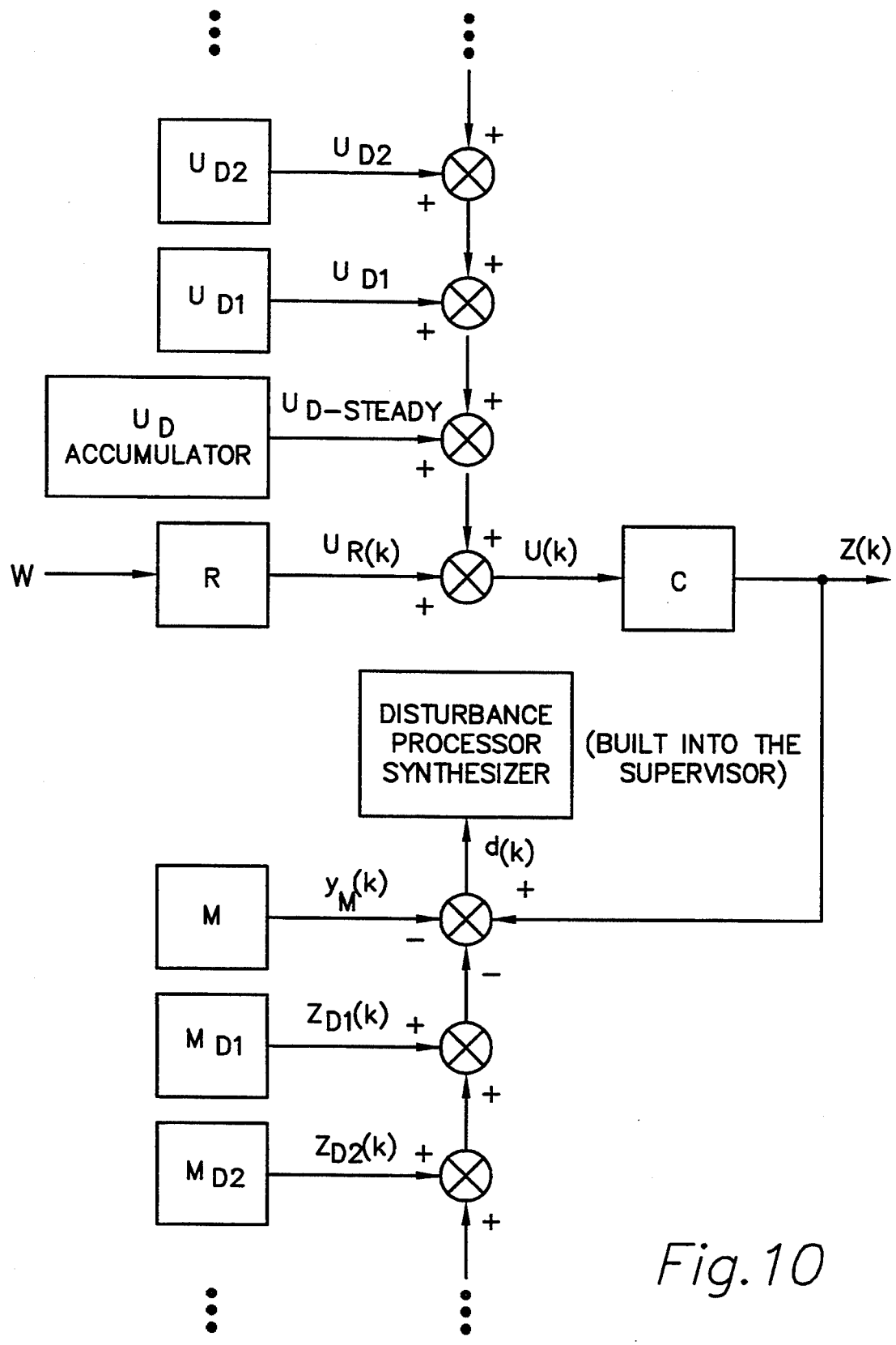
Figure 12A:
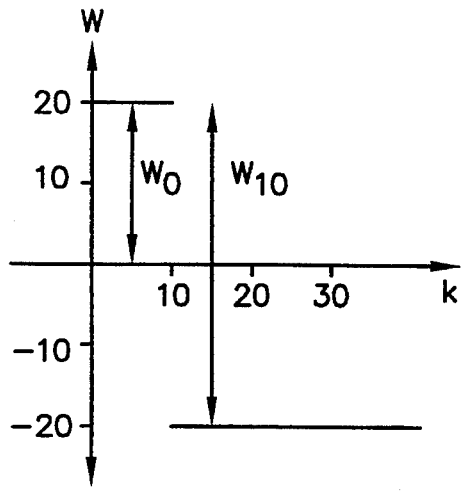
Figure 12B:
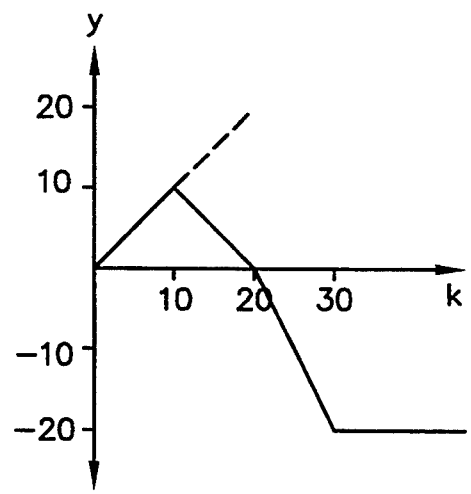
Figure 13A:
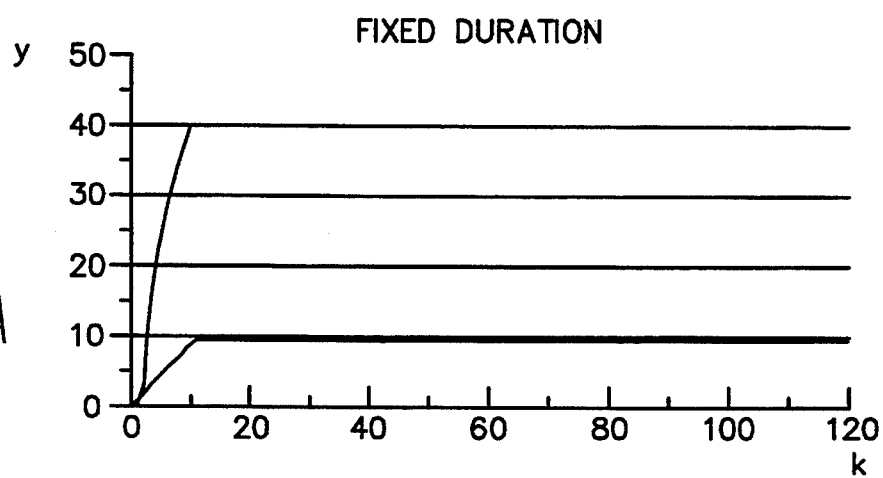
Figure 13B:
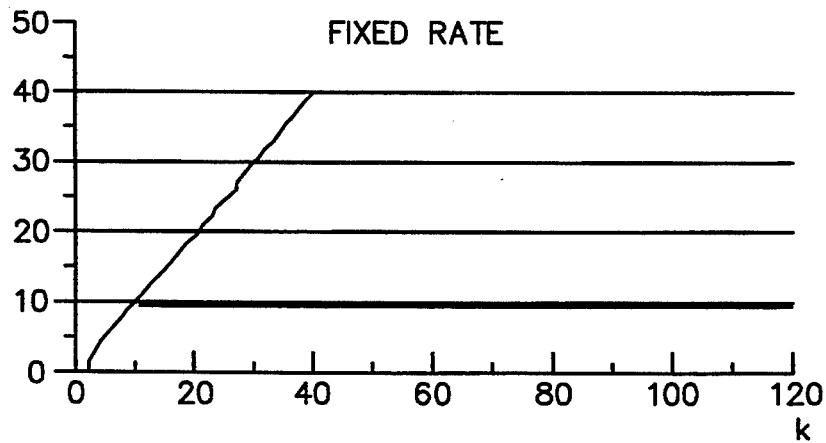
Figure 14A:
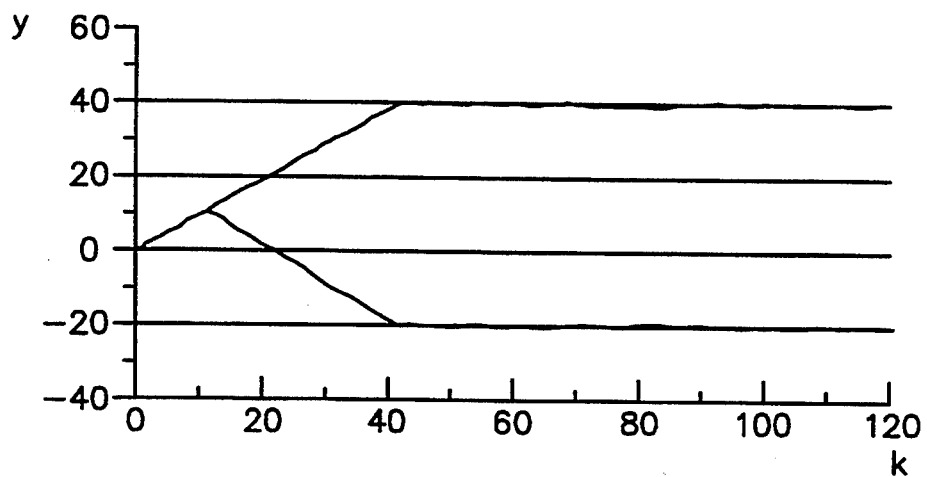
Figure 14B:
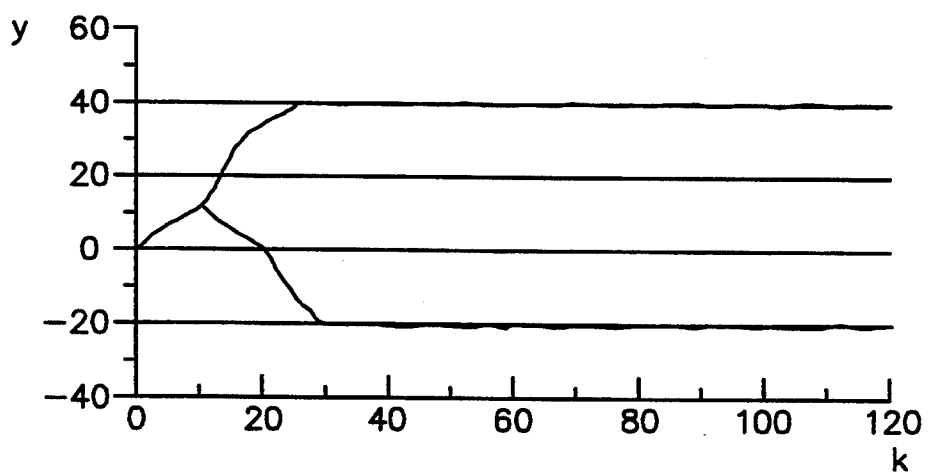
Figure 15A:
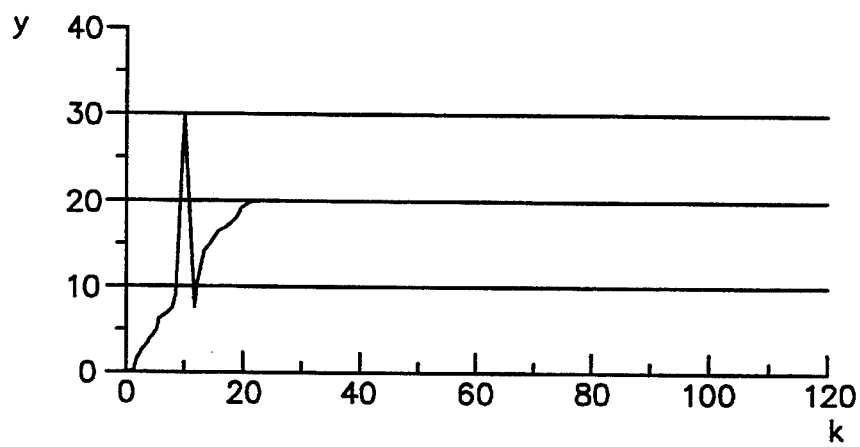
Figure 15B:
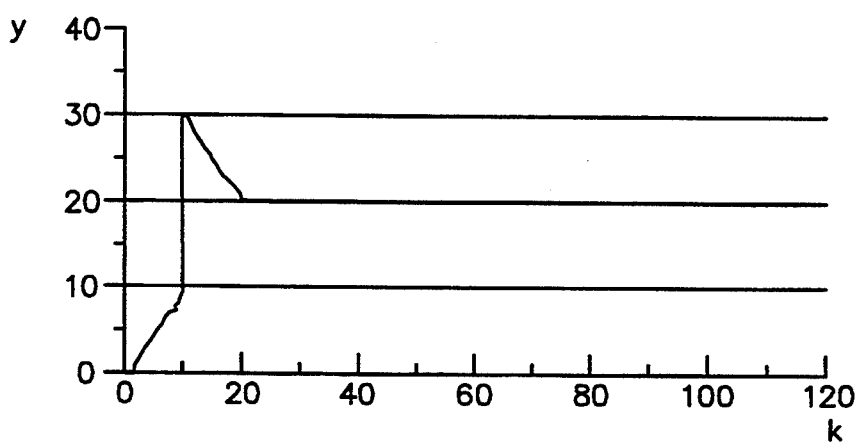
Figure 15C:
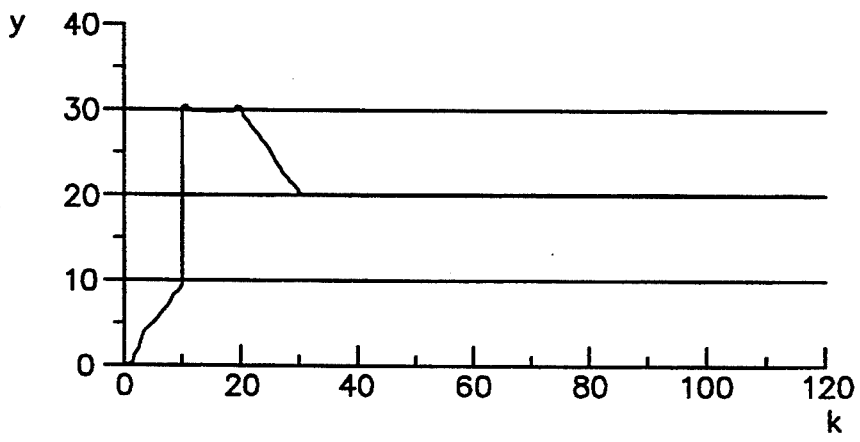
Figure 16A:
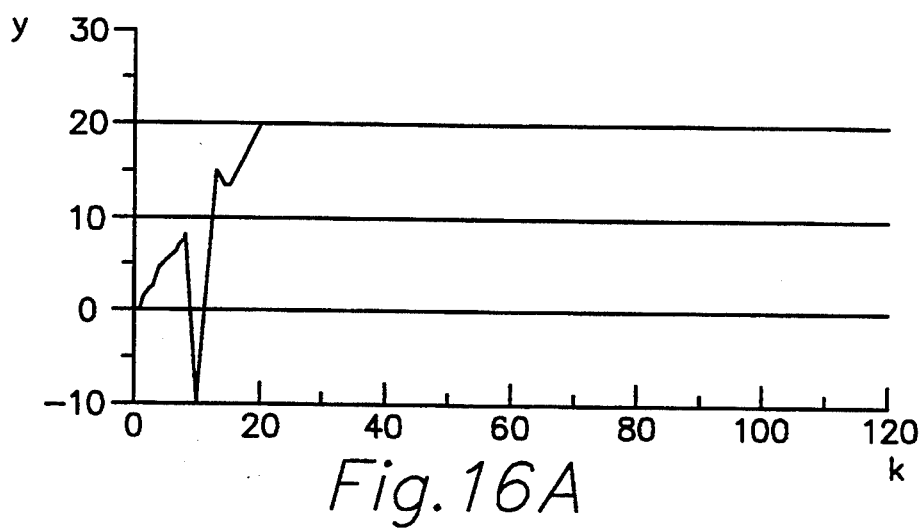
Figure 16B:
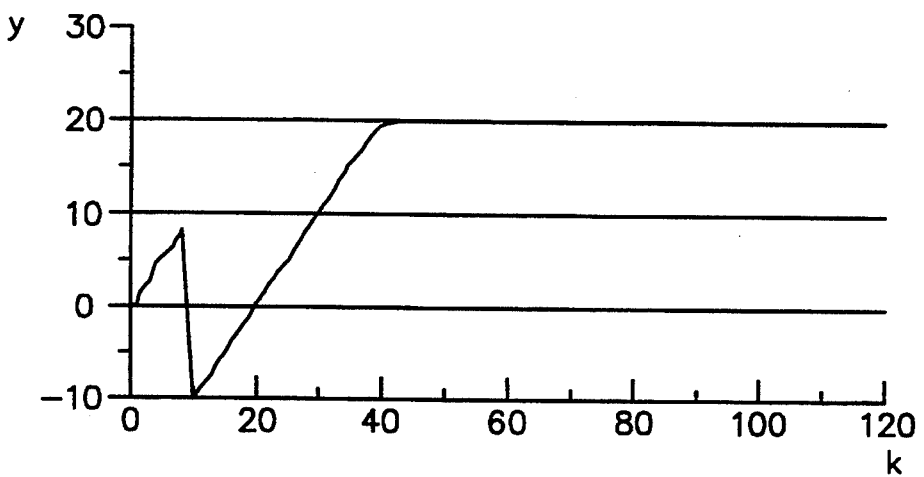
Figure 16C:
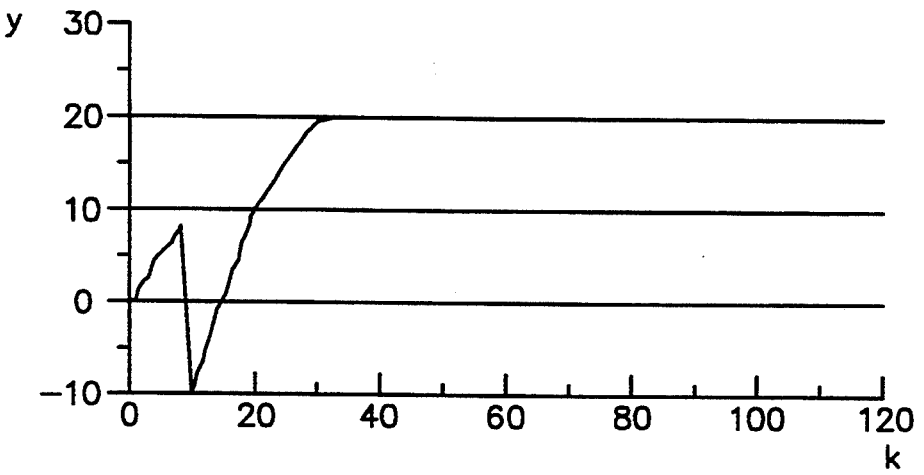
Figure 17A:
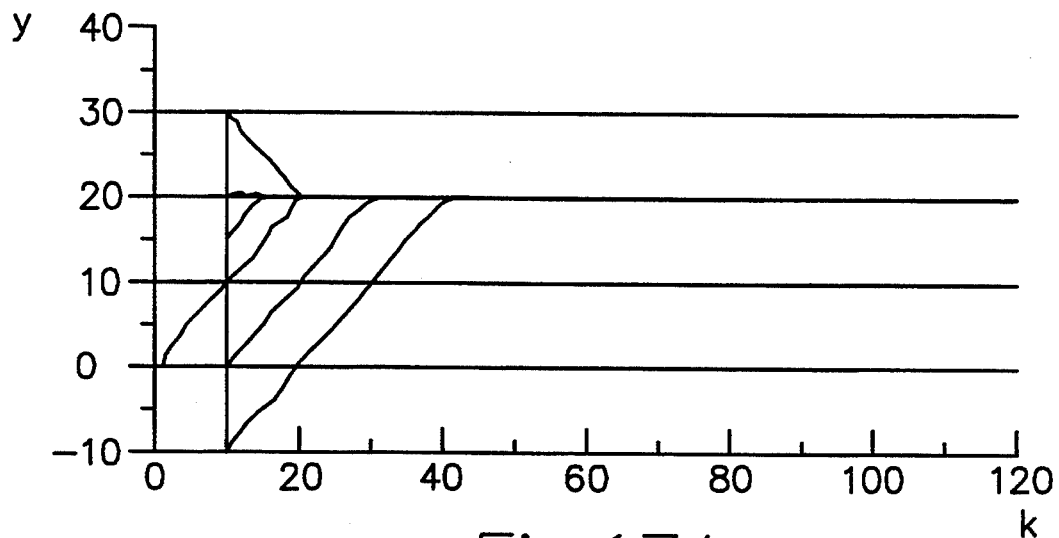
Figure 17B:
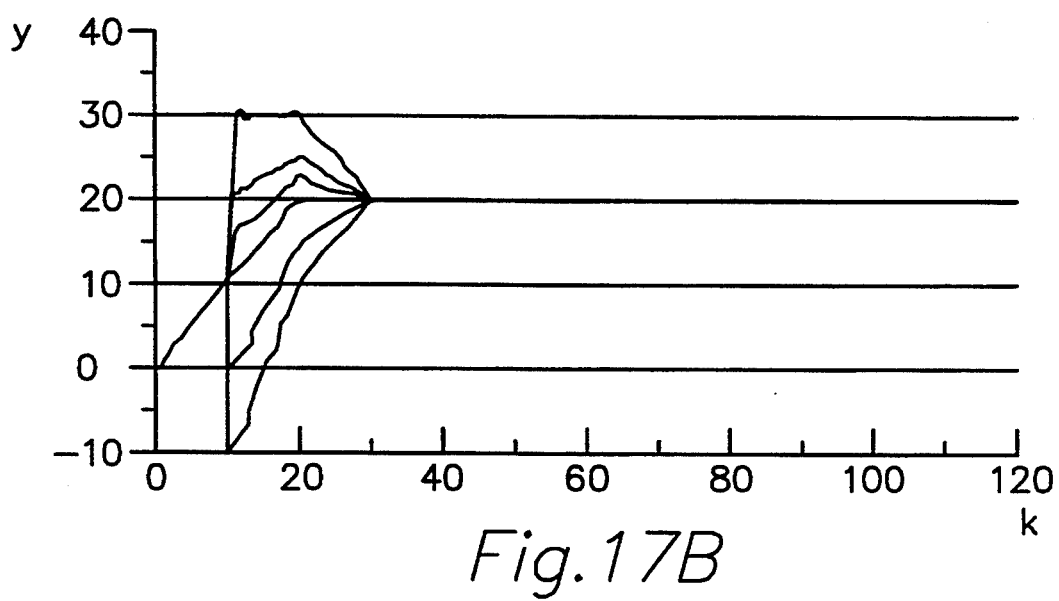
Figure 18A:
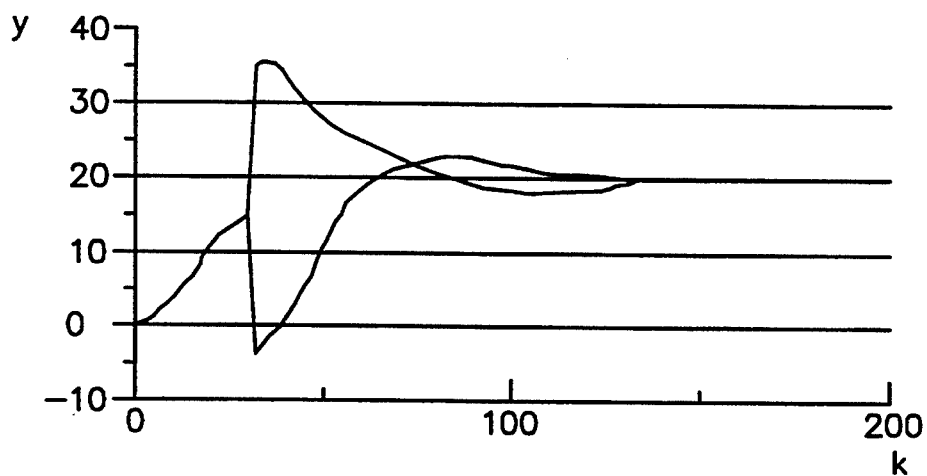
Figure 18A:
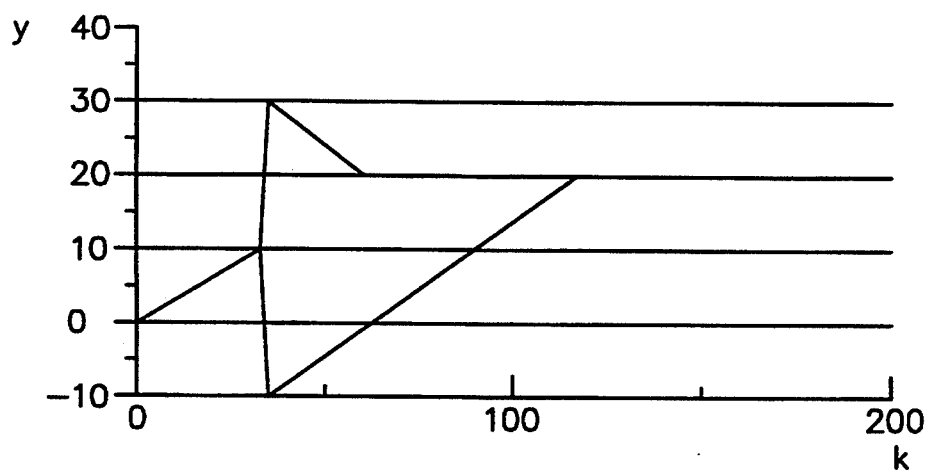
Figure 19A:
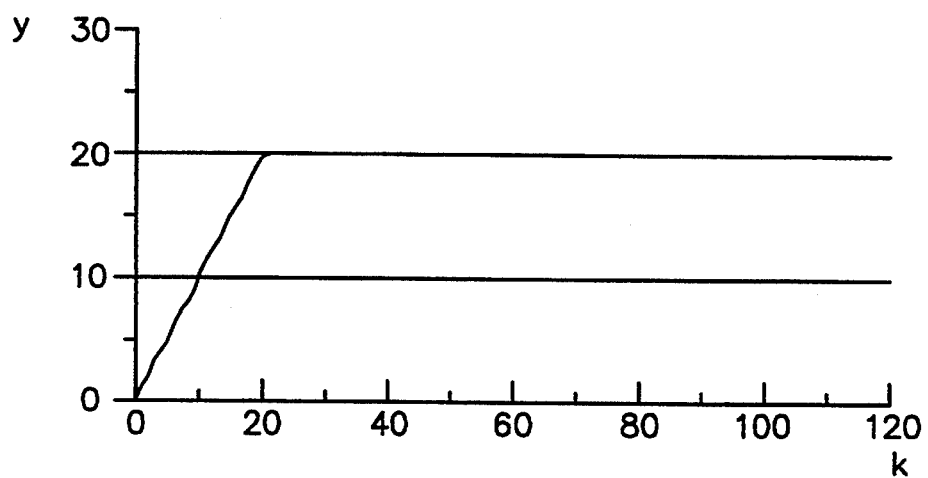
Figure 19B:
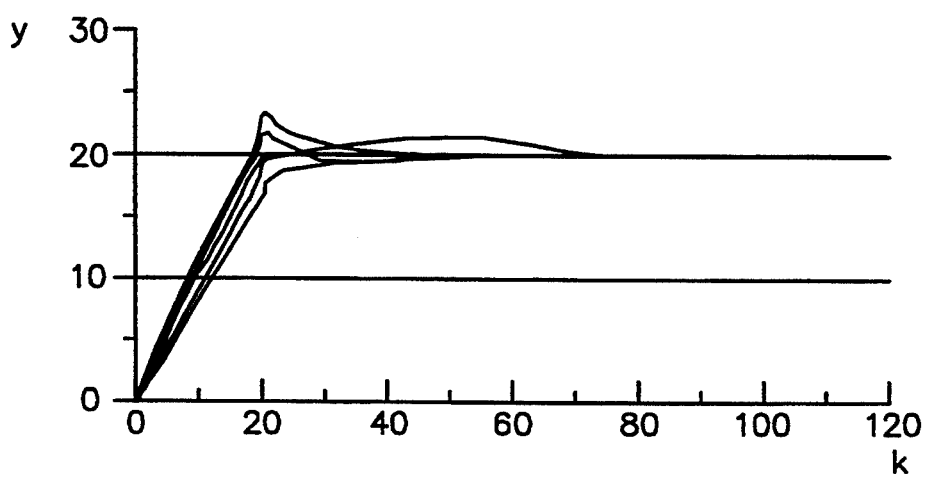
Figure 20A:
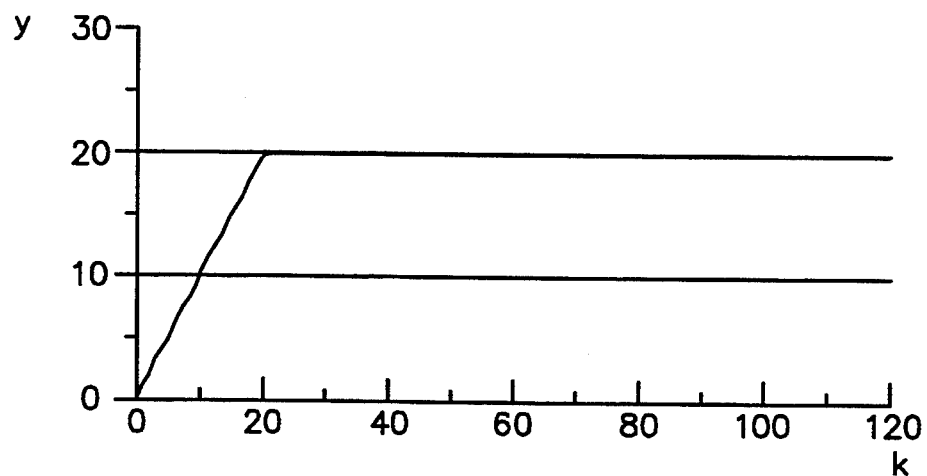
Figure 20B:
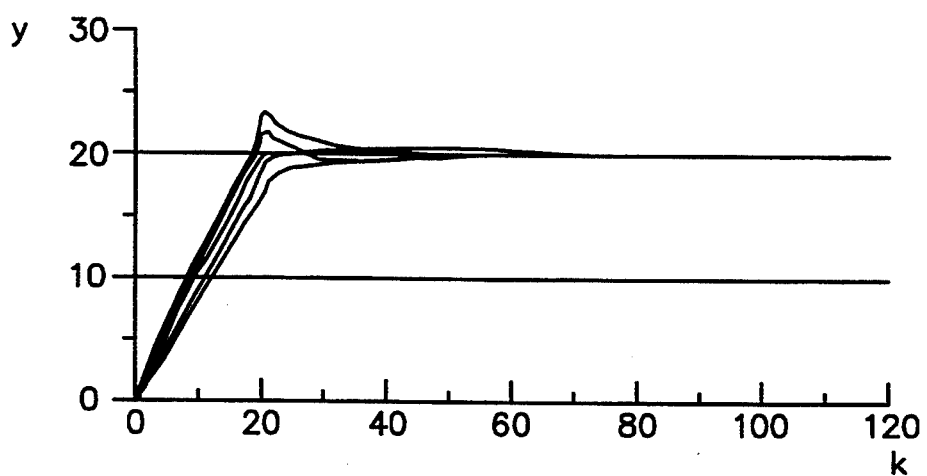
Figure 21A:
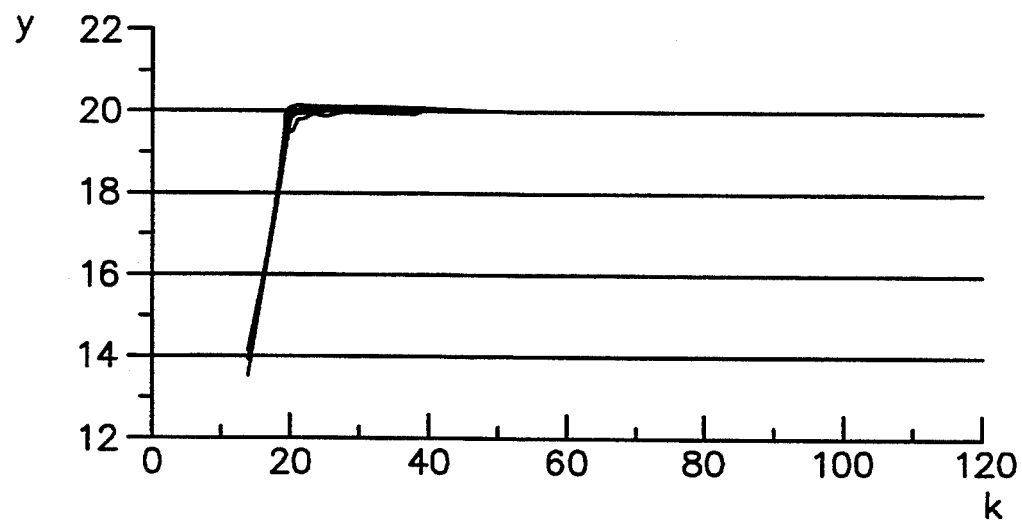
Figure 21B:
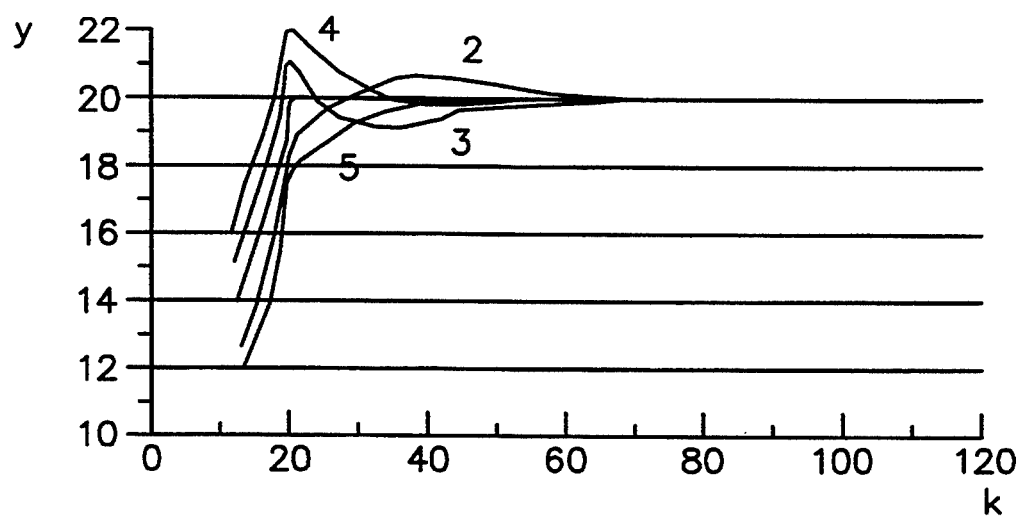
Figure 22A:
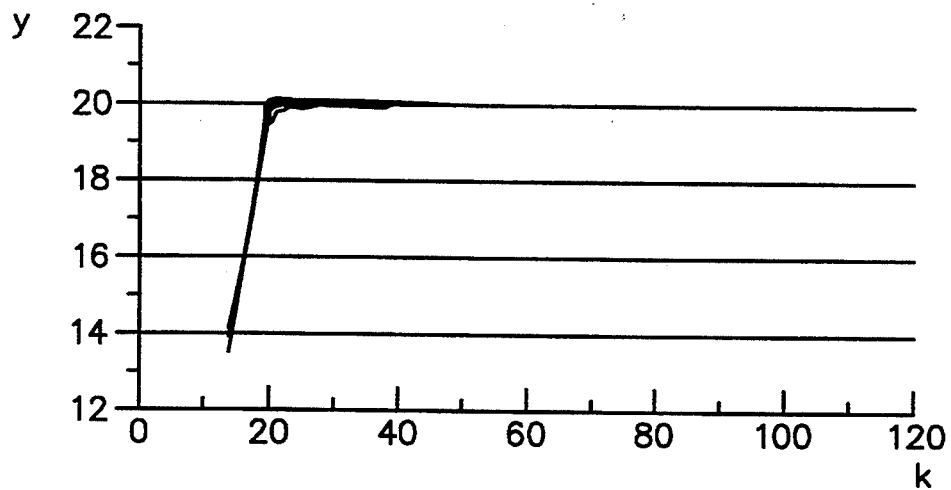
Figure 22B:
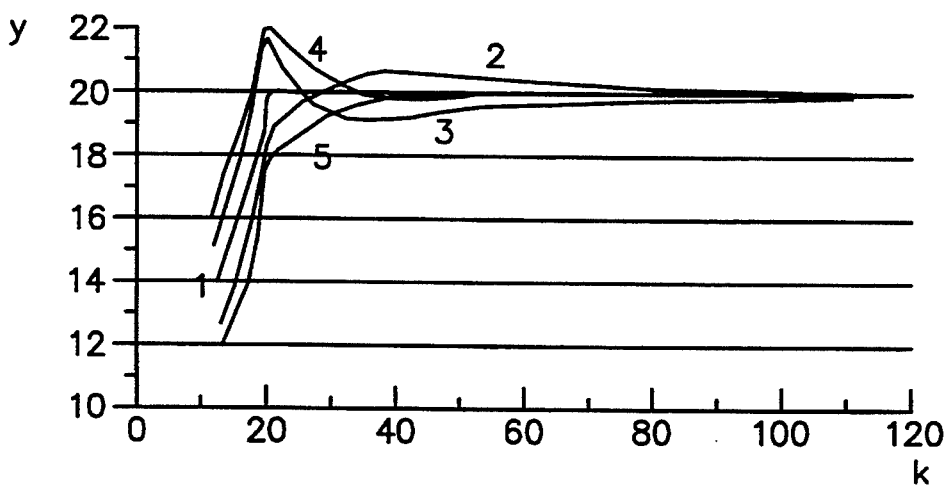

FIG. 8 shows the control system of FIG. 3 at the instant $k=2$;

FIG. 9 shows a control system equivalent to the one in FIG. 8;

FIG. 10 shows an implementation of a design algorithm for a cycling disturbance processor;

FIG. 11 is a reference time profile in which the actual rate between $k=10$ and $k=20$ is 2;

FIG. 12 is a reference time profile in which the actual rate between $k=20$ and $k=30$ is $-2$;

FIG. 13 shows transient responses of the cycling controller with its reference processor operating in fixed-duration (top) and fixed-rate (bottom) modes;

FIG. 14 shows responses of the cycling (top) and linear (bottom) controllers to reference changes;

FIG. 15 shows responses of the cycling and linear controllers to a load change of $+20$. Disturbance processor works in either fixed-duration (top) or global fixed-rate (middle) mode;

FIG. 16 shows responses of the cycling and linear controllers to a load change of $-20$. Disturbance processor works in either fixed-duration (top) or global fixed-rate (middle) mode;

FIG. 17 shows responses of the cycling and linear controllers to load changes of $-20$, $-10$, 0, $+5$, $+10$ and $+20$ units;

FIG. 18 shows responses of the cycling and analog PID controllers to load changes. Disturbance processor works in fixed-rate mode with a settling time similar to that of the PID;

FIG. 19 shows transient responses of system 1 affected by various parameter drifts when controlled by the cycling (top) and linear (bottom) controllers;

FIG. 20 shows transient responses of system 2 affected by various parameter drifts when controlled by the cycling (top) and linear (bottom) controllers;

FIG. 21 shows enlarged plots from FIG. 19;

FIG. 22 shows enlarged plots from FIG. 20; and

Figure 23A:
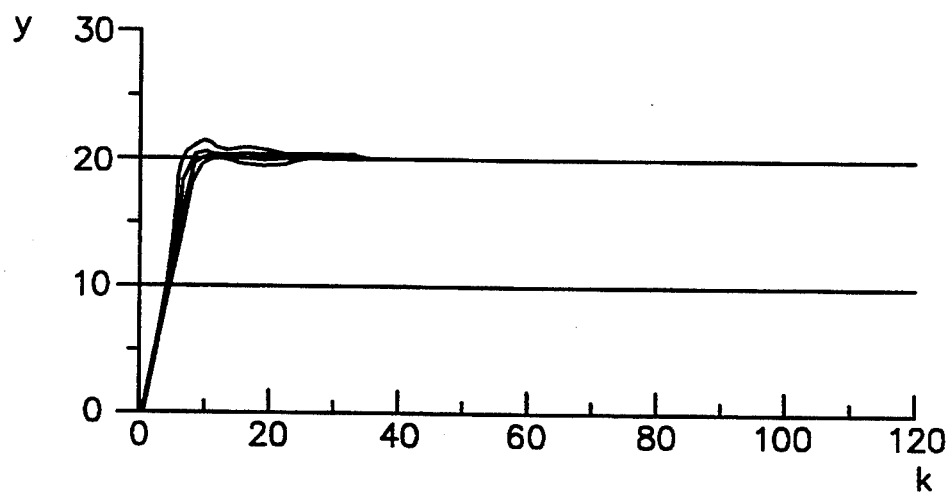
Figure 23B:
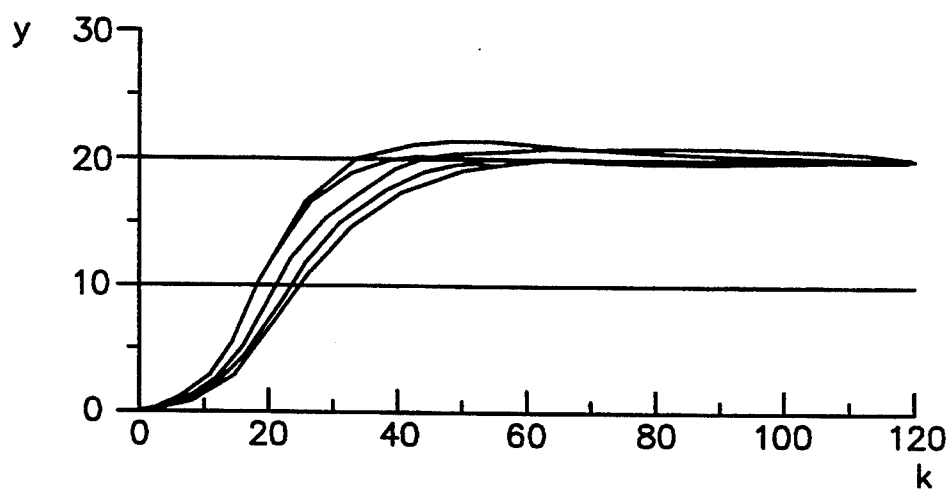

FIG. 23 shows transient responses of system 1 and system 2 affected by various parameter drifts when controlled by analog PID controller set according to the ITAE criterion.

Figure 24:
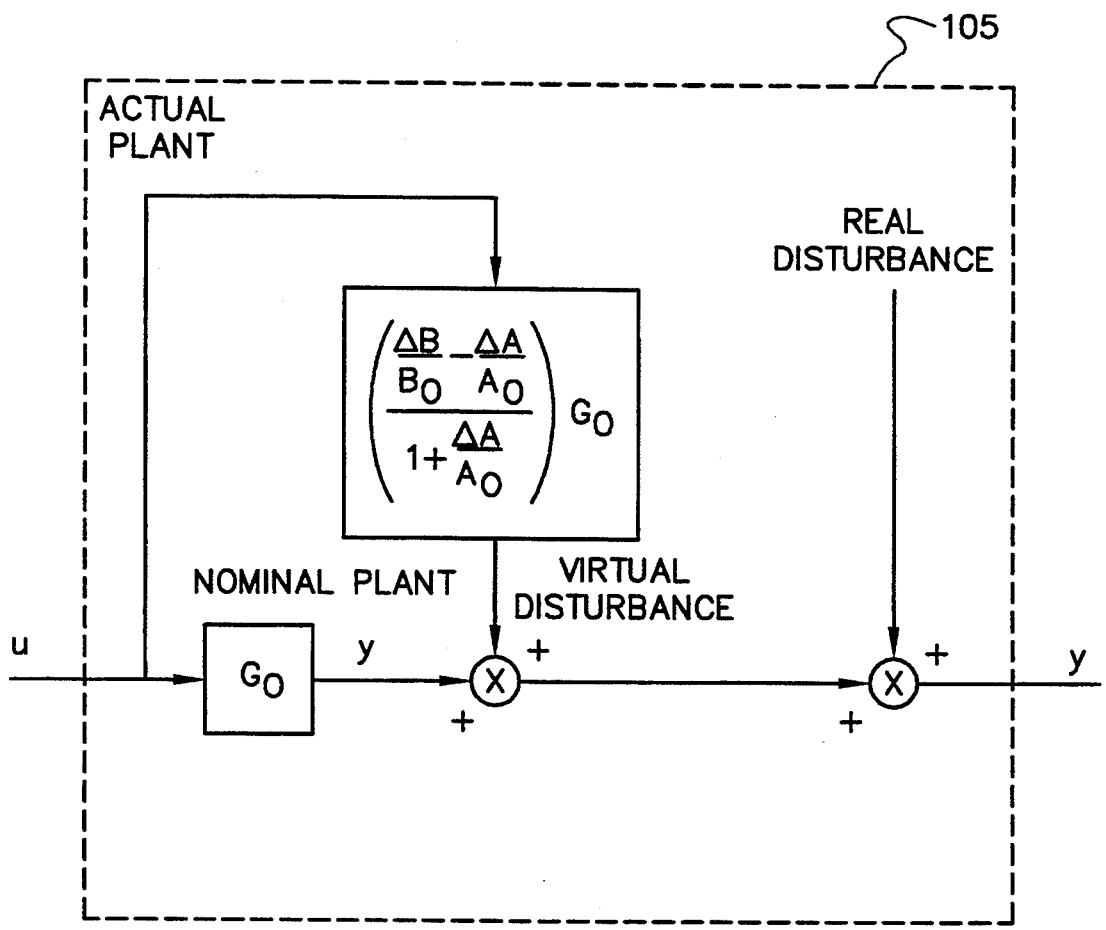
Figure 25:
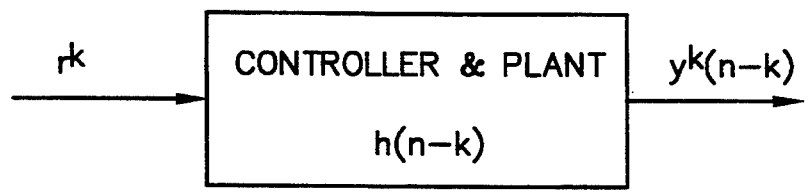
Figure 26:
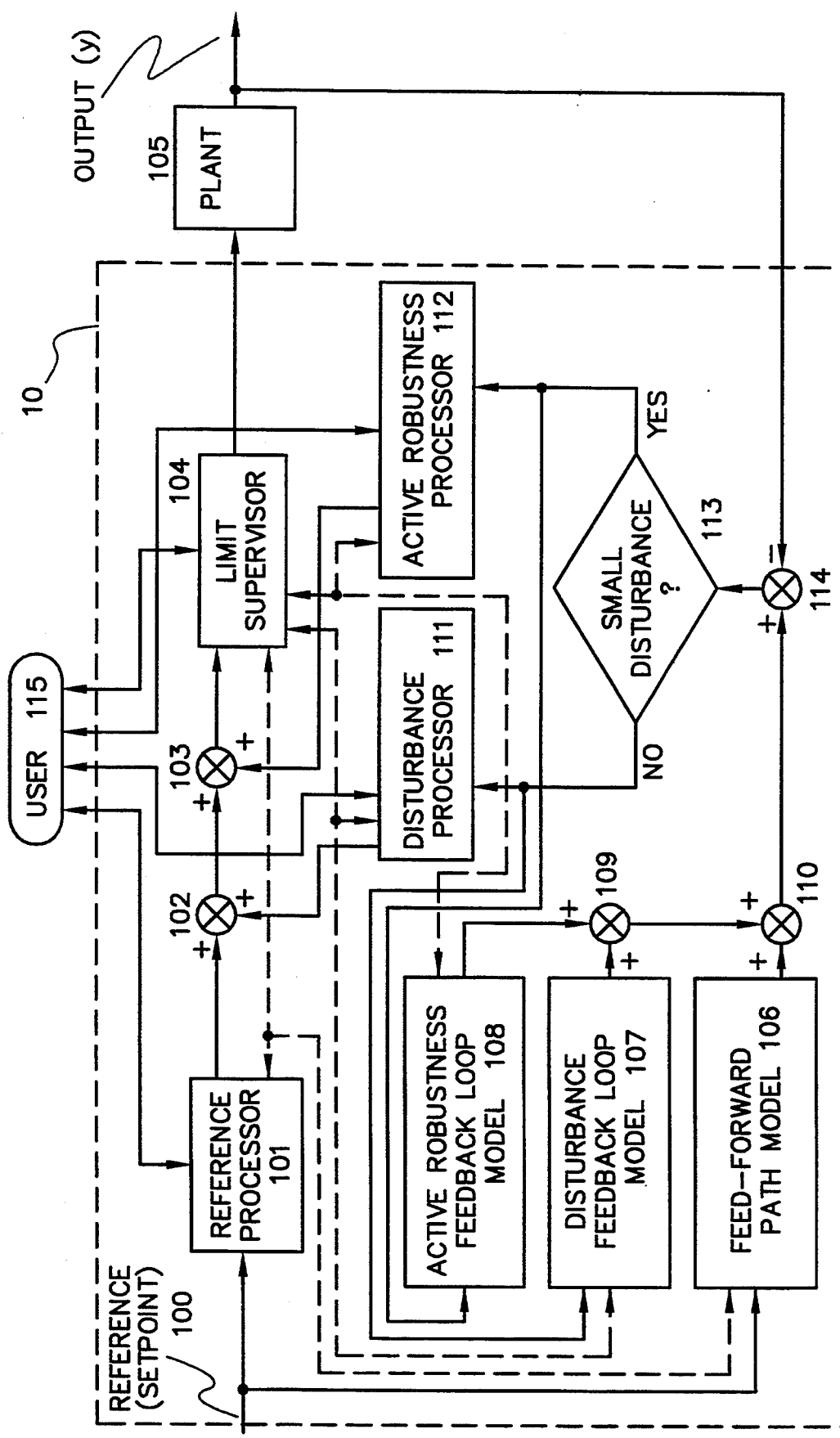
Figure 27:
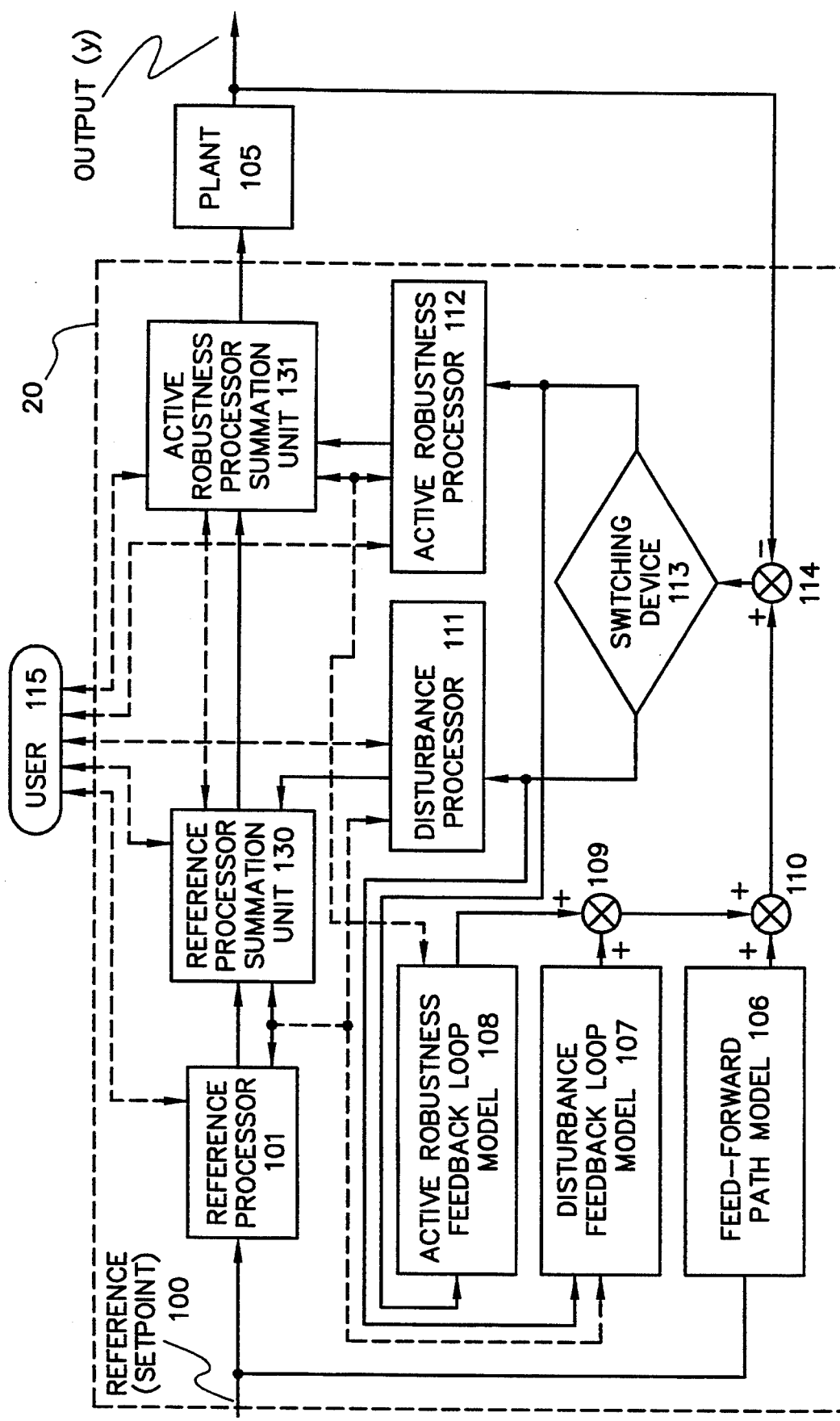
Figure 28:
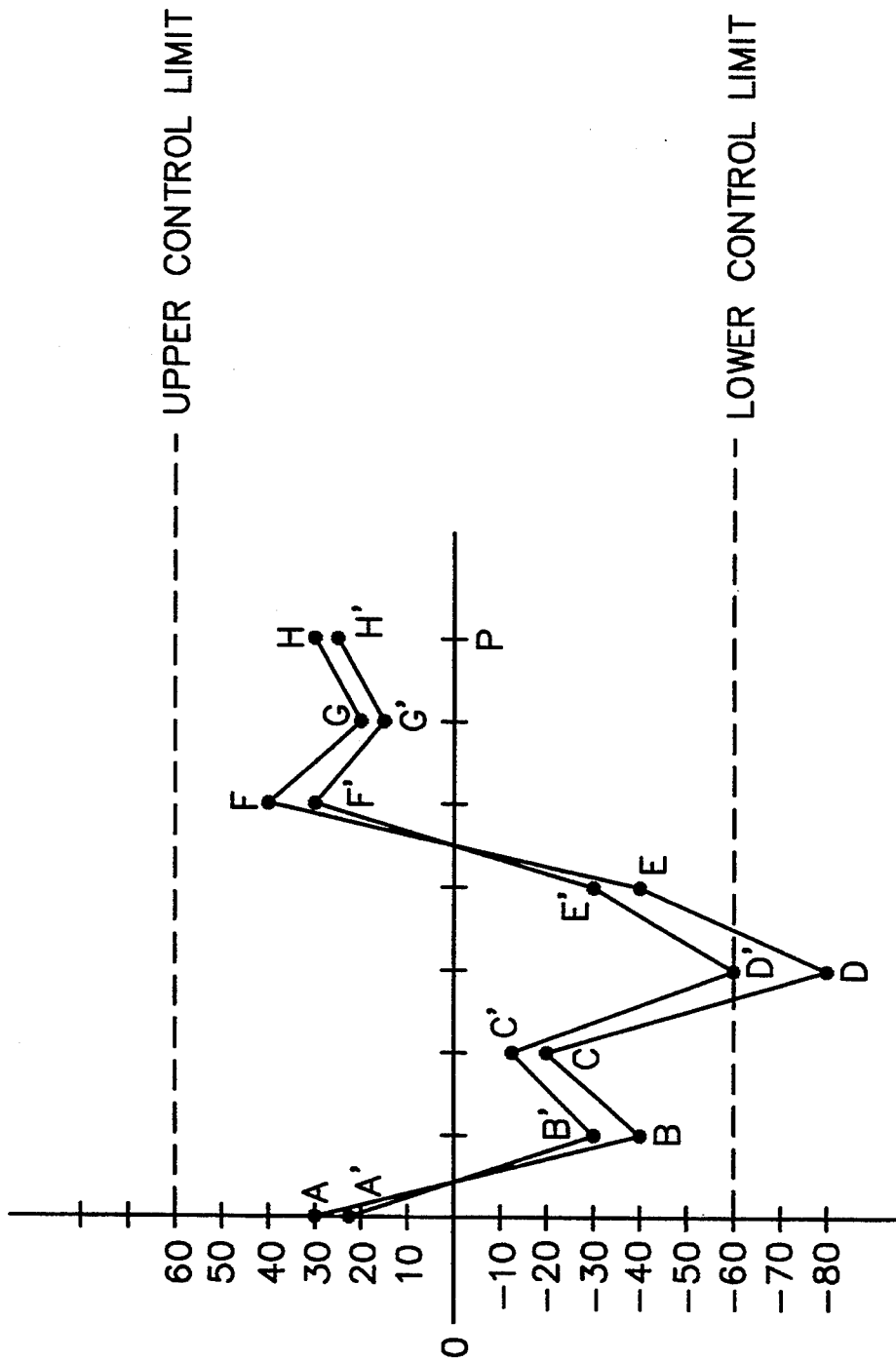

FIG. 24 is a block diagram illustrating a plant—model mismatch;

FIG. 25 is a block diagram illustrating an alternate representation of a linear controller and a plant;

FIG. 26 is a block diagram of the presently preferred implementation of the Single Input Single Output Rate Optimal Controller;

FIG. 27 is a block diagram of an alternate preferred implementation of the Single Input Single Output Rate Optimal Controller; and FIG. 28 is a line graph plotting an illustrative example of control values to demonstrate the action of scaling to ensure that user defined limits are not exceeded.

Figure 29:
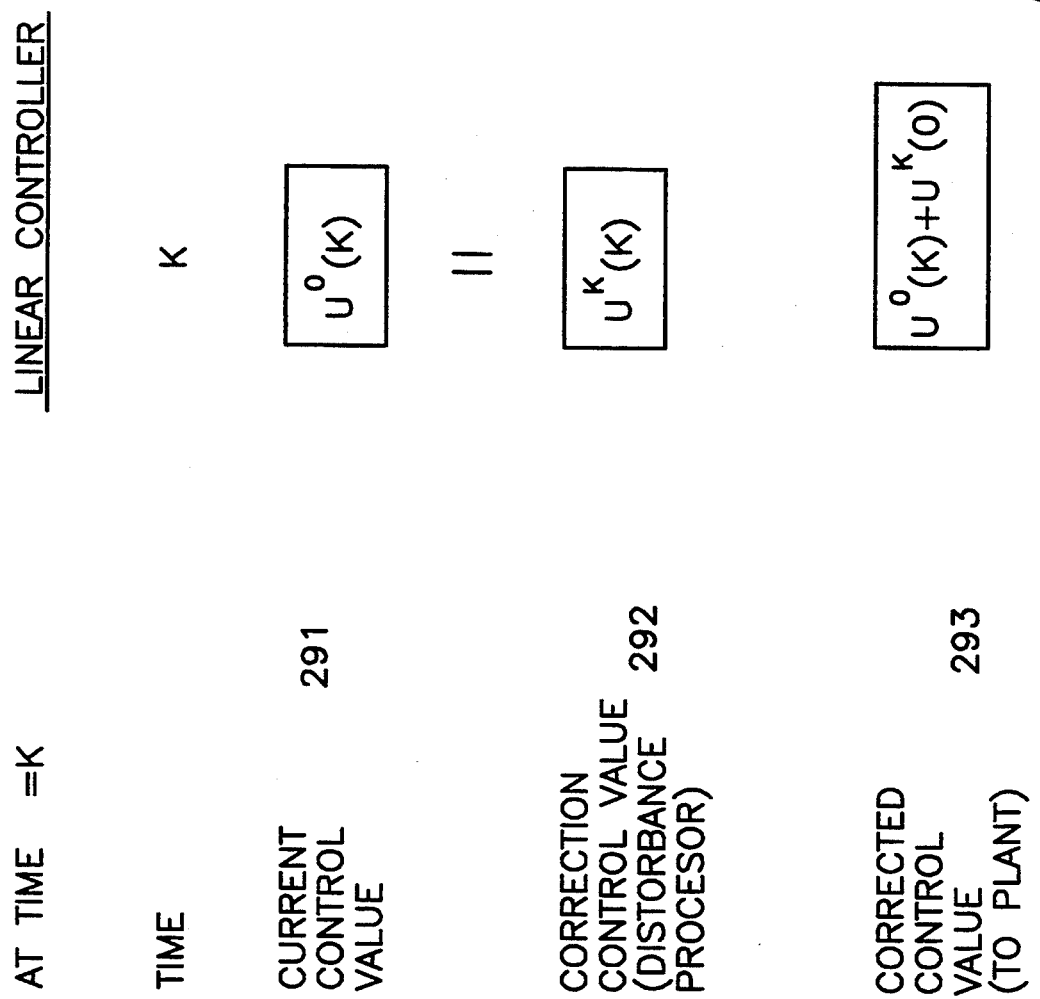

FIG. 29 is a graphical representation of snapshots of control values for a linear controller.

FIG. 30 is a graphical representation of how the current output sequence is generated in accord with the preferred embodiment.

FIG. 31 is a graphical representation on how the desired output sequence is generated in accord with the preferred embodiment.

FIG. 32 is a graphical representation of how the ideal correction output sequence is determined in accord with the preferred embodiment.

Figure 33:
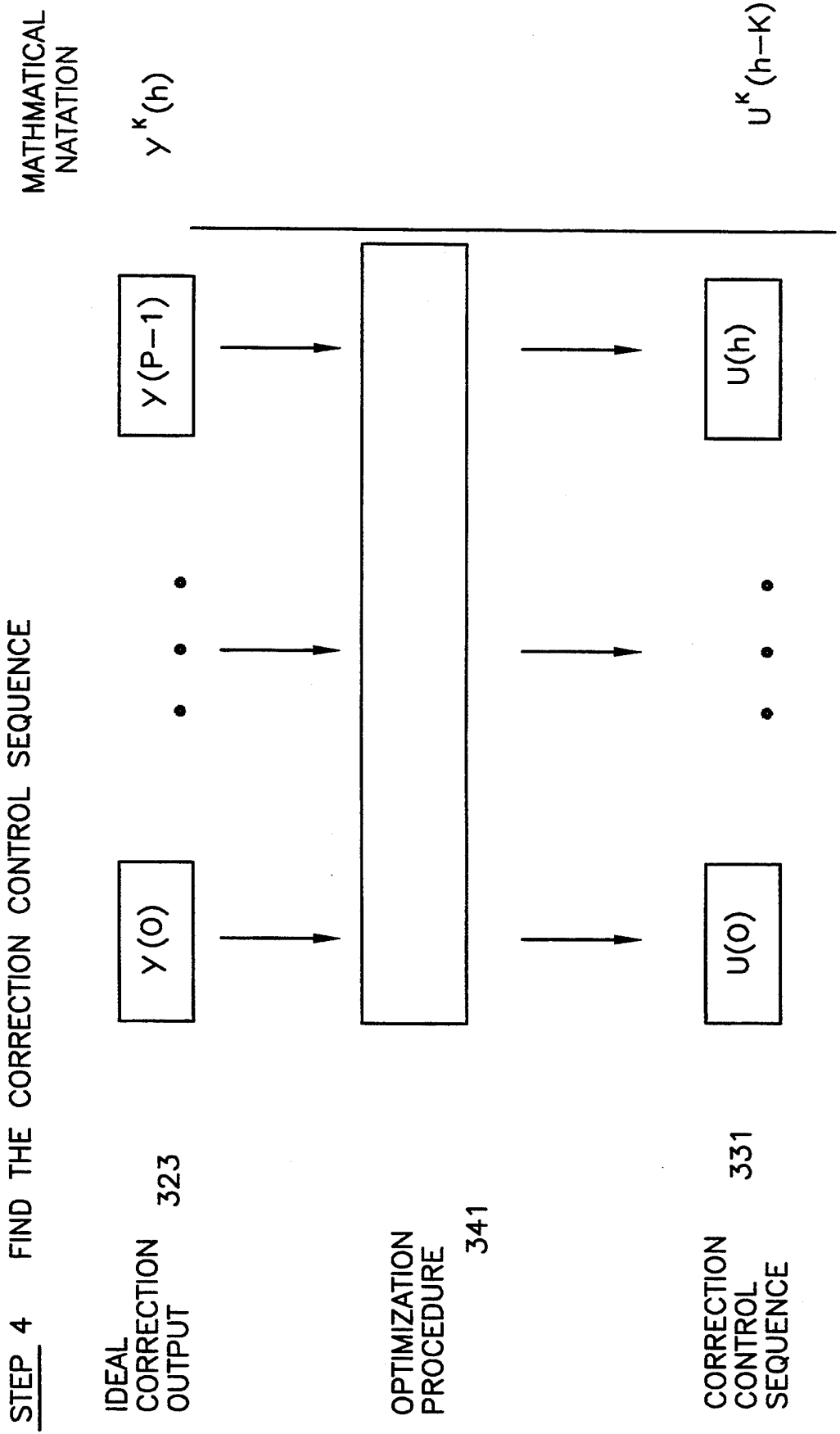

FIG. 33 is a graphical representation of how the correction control sequence is determined in accord with the preferred embodiment.

FIG. 34 is a graphical representation of how the current control sequence is determined in accord with the preferred embodiment.

DESCRIPTION OF THE PREFERRED EMBODIMENT

FIG. 26 is a block diagram of a presently preferred embodiment of the SISO ROC 10. This embodiment has: a user controlled reference input 100, a reference processor 101 that generates a sequence of plant control signals, an adder 102 that combines the reference processor control sequence with the disturbance processor control sequence and another adder 103, that combines the control sequence from 102 with the active robustness control sequence from 112. The output of adder 103 is sent to the limit supervisor 104 that ensures the control sequence received from 103 does not violate any user defined limitations and sends that supervised sequence to a plant 105. If the limit supervisor 104 alters the received control sequence, it will inform the disturbance processor 111, the active robustness processor 112, the active robustness feedback loop model 108 and the disturbance feedback loop model 107 of the corrections that were made. The plant output y is forwarded to subtractor 114. A feedforward path model 106 also receives the reference input and generates the expected plant output. The output of model 106 is combined with the outputs of a disturbance feedback loop model 107 for generating the expected disturbance and an active robustness feedback loop model 108 for generating the expected active robustness disturbance, by an adder 109 for combining the expected active robustness disturbance and the expected disturbance together, another adder 110 for combining the result from 109 to the expected plant output, and a subtracter 114 for generating the signal representing the difference between the expected and actual plant output. A switching device 113 decides whether the error is large or not, and sends large errors to the disturbance processor 111 and disturbance feedback loop model 107 and small errors to the active robustness processor 112 and the active robustness feedback loop 108. The disturbance processor 111 generates a sequence of corrections based on its input and sends them to adder 102. The active robustness processor 112 also generates a sequence of corrections based on its inputs and sends its corrections to adder 103. It should be noted that any or all of these processors may be implemented in hardware or software. A user input device 115 is provided to allow the user to alter the control laws, operating limits and other parameters of this controllers processors, models and supervisor. Note that the solid lines in FIG. 26 denote control signal paths, and the dotted lines connecting processors or the limit supervisor indicate data or control pathways. Note also that these pathways may be implemented in hardware or by software configuration of a general purpose computer system.

FIG. 27 is a block diagram of an alternate embodiment of the SISO ROC 20. In this embodiment the limit supervisor 104 and two adders 102, 103 that were in the preferred embodiment are replaced with a reference processor summation unit 130, that combines the reference processor control sequence with the disturbance processor control sequence in such a manner as to avoid violating user defined constraints, and an active robustness processor summation unit 131, that combines the control sequence from the reference processor summation unit and the control sequence from the active robustness processor in such a manner as to avoid violating user defined constraints.

DISCUSSION OF FIXED-DURATION AND FIXED-RATE CONTROL LAWS

Figure 1:
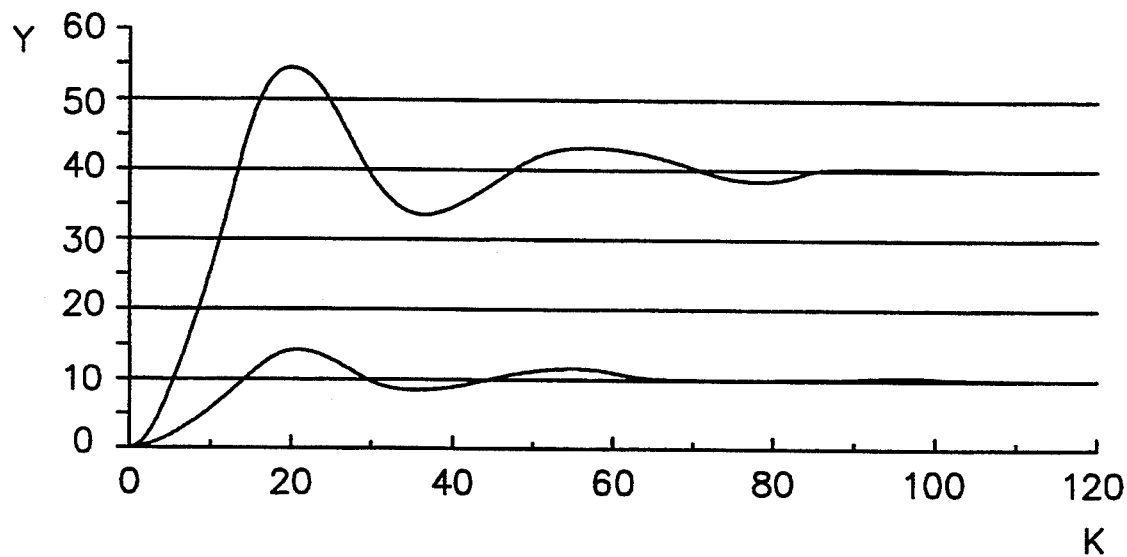
FIG. 1 shows transient responses of a linear control system for two different input step amplitudes that are scaled versions of one another.
Figure 1A:
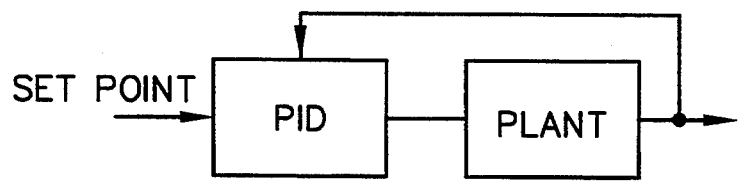
FIGS. 1A and 1B are schematic showings respectively of the prior art PID controller and the controller embodying the invention herein.
Figure 1B:
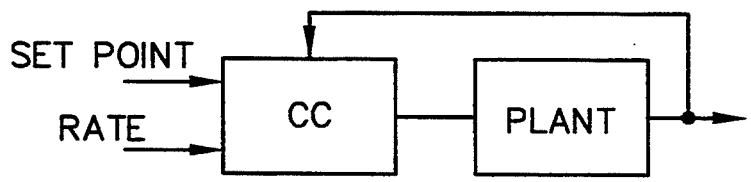

FIG. 1 shows two transient responses of a plant controlled by a prior art type PID controller in the output-feedback closed loop as illustrated schematically in FIG. 1A. A corresponding schematic showing of the controller of the invention herein is shown in FIG. 1B. Although FIGS. 1A and 1B may suggest a close similarity between the PID controller and the new controller herein, they are in fact basically different in their behavior and internal structure.

The responses shown in FIG. 1 correspond to step inputs with different amplitudes: w=10 and w=40 units. Along the output value axis, the responses are scaled versions of one another. This is a consequence of the system's linearity and therefore would be true even if the simple PID were replaced by an advanced state-feedback controller. FIG. 1 also shows that the time scale of the responses remains constant. In this discussion, any control law maintaining a constant time scale regardless of the input step amplitude will be called a fixed-duration control law.

Figure 1C:
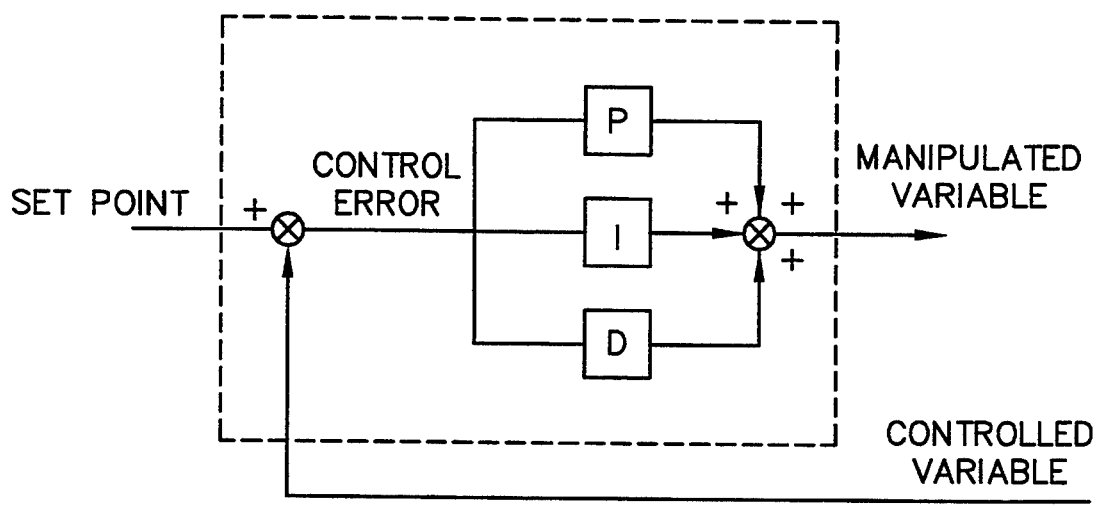
FIG. 1C shows the internal construction of a PID controller.

FIG. 1C shows the internal structures of a prior art PID controller. In the PID control, the set point and actual output are subtracted to produce control error, which is then processed by the controller. This mixing of the set point and output into a single error signal makes it impossible to keep their processing separated and still have the freedom to choose the set point and load/disturbance control laws individually to meet best the application needs. Another disadvantage of the scheme is that it prevents the use of active measures for increasing the control system robustness to adjust for parameter drifts and nonlinearities of the controlled plant.

Figure 2A:
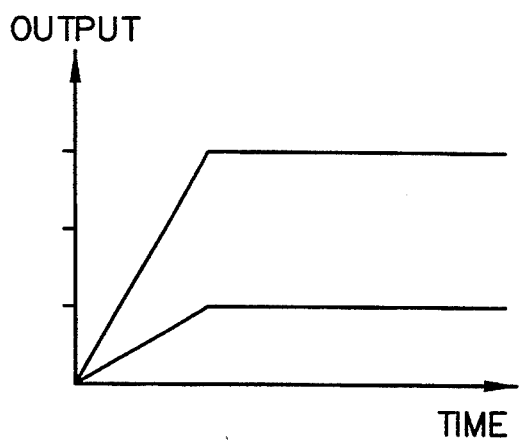
FIG. 2 shows responses of fixed-duration (upper) and fixed-rate (lower) control systems.
Figure 2B:
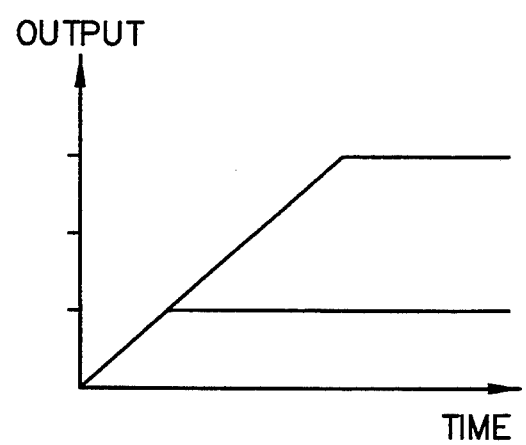

An immediate consequence of fixed-duration control is that the rate of change of the output variable is proportional to the reference (set-point) or load amplitude. If the rate is to be constant, the transient behavior duration must be proportional to the change. FIG. 2 compares the idealized responses of a fixed-duration control system with fixed-rate control. Unlike the former, the latter is not feasible with a linear controller. This makes designing a general-purpose, fixed-rate controller a challenging engineering problem.

The two control laws are incompatible in that the user cannot have both at the same time. Which one to use is application dependent. There are numerous applications in which fixed-rate control is preferable, while in other cases, the time required to eliminate the control error is the most valuable asset, and fixed-duration control will clearly be the law of choice. However, a general-purpose controller should offer both options so that the user can decide which control law best meets his needs and he is not forced into using only fixed-duration control.

Even with options, the choice may be ambivalent. The reference (set-point) changes are often made by the plant operator and therefore may be planned to allow enough time for a smooth, fixed-rate transition that would not excessively stress the plant. On the other hand, if an unpredictable, abrupt load change occurs, stress is unavoidable and the plant should be brought out of the situation as quickly as possible, even if the action might cause additional minor stresses. This situation calls for fixed-duration control, possibly time-optimal control.

An ideal solution for many applications seems to be fixed-rate control for the reference load and fixed-duration control for load changes and other disturbances affecting the controlled plant. This idea is not feasible in conventional control systems, in which the impact of both the reference and load/disturbance changes is mixed into a single control error and consequently is processed by one controller.

FIG. 3 shows a scheme in accordance with the invention herein that combines the advantages of feedback with separate handling of the reference and load disturbance changes. If properly designed, such a control system allows the user to choose different control laws for handling the reference and load/disturbances while preserving all the advantages of feedback control.

FIG. 3 shows a controller 10 embodying the invention herein, which is referred to as a cycling controller. Controller 10 has a reference processor R, which is essentially an open-loop controller that generates a baseline reference control signal $U_R$, which, in the absence of disturbances, would bring a plant into a desired state along a definite, user-defined path. The expected plant output $y_M$ at any instant along the path is provided by a reference model $M_R$. If a disturbance deflects the controlled system off the planned path, a control error e activates a disturbance processor D, which in turn produces a corrective disturbance control signal $u_D$ to push the system back on track. A supervisor S coordinates the two processors R and D because the error e may also occur as a result of both the reference $u_R$ and, subsequently, of the model output $y_M$ change. The action of the disturbance processor D would then interfere with the action of the reference processor R. Assuming that the reference processor R is designed to generate optimal control according to a criterion, such an interaction would create an erratic and undesired mode of operation.

In addition to preventing undesirable interaction of the processors R and D, the supervisor S must, at the same time, orchestrate their actions toward a common goal. If one or both processors are required to operate using the fixed-rate law, the supervisor must schedule the specific tasks of the two processors to guarantee that at no time within the planning horizon the combined control efforts of the two processors violate a user-specified rate.

Using its knowledge of the controlled plant model and the user's rate requirement, the supervisor continuously modifies the reference and disturbance processors as well as the reference model to meet the control objective specified by the user.

Both the reference and disturbance processors work with a finite receding control horizon, whose length is continuously adjusted by the supervisor. The use of the finite horizon causes any control action to terminate in a time given by the horizon length. Because the control in response to an input change is over at the horizon end, the plant model need only be accurate enough to correctly predict the plant response within the horizon. Therefore, simple first- or second-order models that are continuously updated by an on-line estimator work well, even for high-order or nonlinear plants, and provide high-quality control throughout a wide range of the plant's operating points. Various recursive techniques can be used to develop the on-line estimates; for example, an autoregressive moving average model can be estimated using a recursive-least-squares (RLS) method. The RLS technique is given only as an example; many of the recursive methods would be suitable for estimating the reference model.

The cycling controller 10 is shown in FIG. 3 in a control relationship with a plant C, which is not a part of the controller per se. A broken line 12 indicates the separation of the controller 10 from the controlled plant C.

The reference processor R has an input for a user-specified reference setting W. A summing element 14 sums the outputs $u_R$ and $u_D$ of the respective processors R and D and directs the resultant u thereof to the control input of the plant C.

Plant C has a control output y and the reference model $M_R$ has an "expected" plant output $y_M$. A summing element 16 compares the outputs y and $y_M$, and the resulting error signal e is directed to the input of the disturbance processor D.

The coordinating function of the supervisor S relative to the two processors R and D is facilitated by data lines 18 and 20, which provide for the reception of the setting w in the supervisor S and the reference model $M_R$, and data line 22, which provides for the reception of the plant output y in the supervisor S. Birdirectional control lines 30, 31 and 32 extend respectively between the supervisor S on the one hand and on the other hand between the reference processor R, the reference model $M_R$ and the disturbance processor D.

In addition to the set-point input, the controller herein has the rate input through which the user can specify the desired rate of change of the controlled variable. Regardless of the set-point, load or disturbance changes, the controller maintains the actual rate at the desired level. The processing of the set-point changes, and the load or the disturbance changes, are separated. This not only enables the user to specify different control laws for each, but also contributes to the excellent robustness and quality of control.

As the controller herein treats the set-point changes and load disturbances differently, the behavior of the control variable to set-point and load disturbances can be configured as the plant operator desires. For example, set-point changes can be fixed-rate controlled and disturbances can be fixed-duration controlled. FIGS. 3A to 3C show idealized responses of the controller herein to set-point and load disturbances for different configurations of the controller. In some cases, the user may specify a global rate for the controlled variable. The global rate will limit the total control action by the disturbance and set-point processors.

The ability to maintain the controlled variable rate of change is important in applications in which there are strict rate limits. FIGS. 3P to 3R compare the rates of the PID controller and the controller herein (cc) for different load changes, with the latter working at a fixed rate. Since PID cannot guarantee the rate, its desired value is achieved only for a nominal load change, for which the controller was tuned. If the change happens to be larger than nominal, the PID will generate a response with a rate exceeding the nominal value, thus heavily stressing the plant. On the other hand, for changes smaller than nominal the response is unnecessary sluggish. Because the faster-than-nominal responses lower the plant's life expectancy, the PID nominal setting would have to be somewhere in the large changes domain. This will make the control slow for small and medium changes, which prevail in typical installations. To resolve this dilemma, the PID-based front end contains auxiliary logic that tries to adapt its parameters to fit the current situation (gain scheduling, etc.). This clumsy and largely ad hoc design usually results in only a suboptimal solution. The controller herein solves the problem in a systematic way, without the need for custom-made logic.

Control systems with the controller herein exhibit robustness that cannot be matched by conventional controllers. This robustness is a result of the tight feedback applied by the disturbance processor along the entire transient, whose expected shape is computed by the controller's processors. The models enable the processors to detect the slightest deviations from the expected path and immediately initiate a corrective action before they grow too large. On the contrary, in conventional control systems, only the transient's steady-state value can be under feedback control, since nothing else is known about it. The particular shape of the transient is molded implicitly by choosing suitable closed-loop parameters, which inevitably makes the systems vulnerable to parameter drifts. At best, conventional systems can only provide passive robustness to parameter drifts, as opposed to the active approach to suppressing the effects of disturbances in systems built with the controller herein.

It is envisioned that the controller herein will be able to provide a better prediction of the available megawatt rate from a plant to the system dispatcher. Controllers herein implemented at lower levels will provide near-perfect protection of the equipment from mechanical and thermal stress.

The cycling controller 10 has the following features and advantages:

Totally independent handling of reference and load/disturbance changes. For each, the user can specify either the fixed-duration or fixed-rate control law with arbitrary values.

A finite settling time.

Controller parameters, settling time and rate of change that are easily understood by field personnel. Overshoot is not specified because the controller's responses have no or negligible overshoot.

For fixed-rate control, the controller maintains the current rate at the maximal, user-specified value, thus minimizing overall settling time. In practice, this means that most small disturbances are eliminated fastest by using time-optimal control.

For both control laws, the transient responses are the best least-mean-square error approximations of a linear ramp that can be obtained using a digital linear controller.

Since the above near-perfect ramp responses tend to require rather oscillatory control signals that may, in some applications, overly strain system actuators, the user may exchange the ramp linearity for a smoother control signal. The controller's "smoothness" parameter may take on values ranging from 0 to 100 percent. When the value is set to 0, the best ramplike responses are used regardless of the control signal profile. At the other extreme, a value of 100 guarantees a control signal with an appropriate finite duration, which is the smoothest in the sense of the least mean square of its time difference. The intermediate values offer a weighted compromise of the two extremes.

Excellent robustness with respect to plant parameter drifts.

DESIGNING THE DISTURBANCE PROCESSOR

Consider a time-invariant linear controlled system with a known z-transfer function C for which the reference processor R and model M have been synthesized so that in the absence of disturbances, the equality $$y(k) = y_M(k) \tag{1}$$

would hold for all sampling instants $k = 0, 1, 2, \ldots$. The equality implies $$C \cdot R(k) = M_R(k) \tag{2}$$

where $R(k)$, $M_R(k)$ are the z-transform transfer functions of the reference processor and model. The argument k indicates that, in general, they vary in time.

Let it further be assumed that the reference is the step function with amplitude w, i.e., $$w(k) = w \text{ for all } k > 0 \tag{3}$$

Because the constant reference will demand neither a time-varying reference processor nor a model, it is also temporarily assumed $$R(k) = R \text{ and } M_R(k) = M \tag{4}$$

where R, M are ordinary z-transfer functions presumed to be known.

The control system's linearity allows us to investigate the impact of the disturbances d(k) affecting the system's output y(k) at different instants $k = 0, 1, 2, \ldots$, one at a time, and their overall influence later. For our analysis, it is convenient to think of the disturbance function as composed of step functions with amplitudes $$d_k = d(k) - d(k-1) \tag{5}$$

FIG. 4 illustrates the concept.

Having introduced all necessary background, we can begin with an explanation of how the disturbance processor works. As seen in FIG. 4, there is no disturbance at the instant $k = 0$. Hence, $$z(0) = y(0) = y_M(0) \tag{6}$$

and no corrective action is needed. The control is open loop since the disturbance processor D(1) appears to be nonexistent.

At the instant $k = 1$, the disturbance $d(1) \neq 0$ causes the error $e(1) \neq 0$, and a disturbance processor D(1) is synthesized to correct the output by adding the disturbance control $u_{D1}$ to the reference control $u_R$ as shown in FIG. 5. As will become clear, D(1) is actually only the first stage of the processor.

Because of the controlled system dynamics, the effects of disturbance $d_1$ cannot be compensated in one sampling period. Depending on the system as well as on how the processor stage D(1) is designed, it will require $T_{S1}$ sampling periods to eliminate the impact of the disturbance.

The diagram in FIG. 5 can be transformed into the equivalent diagram depicted in FIG. 6, in which the contributions of the reference and disturbance control signals are separated, producing the reference output $y_R$ and the disturbance output $y_{D1}$. Of course, neither is directly measurable on the actual system.

Referring to FIG. 6, it is evident that the outer loop actually serves no purpose, as $y_M = y_R$ for all k by assumption (1), and therefore may be dropped without affecting the system's behavior. This, together with another equivalent modification of the internal loop, yields the final diagram in FIG. 7. It is important to notice that disturbance $d_1$ appears as the reference of a conventional feedback loop. Since C and D(1) are known and $d_1$ can be computed from $$d_1 = z(1) - y_M(1) \tag{7}$$

we can also compute the entire disturbance control sequence $u_{D1}(1), U_{D1}(2), \ldots, U_{D1}(T_{S1})$ in advance. Its application will eventually eliminate the effects of disturbance $d_1$.

Proceeding to the next instant $k=2$, the disturbance $d(2)$ will produce the step $d_2=d(2)-d(1)$, whose effects will be eliminated by another disturbance processor stage $D(2)$ as shown in FIG. 8. After rearranging the diagram using equivalent transforms, we obtain the control system in FIG. 9.

If the system is to be of any practical value, the disturbance step $d_2$ must also be known. However, it cannot be computed as easily as $d_1$ by simply comparing $y_M(2)$ and $z(2)$, since the first disturbance control sequence is already in action as shown by the formula for $d_2$:

$$d_2 = z(2) - (y_M(2) + z_{D1}(2)) \tag{8}$$

The contribution $z_{D1}(2)$ to the output $y_R(2)$ to compensate $d_1$ cannot be measured directly; however, it can be computed by using a disturbance model $M_{D1}$ of the closed loop around $CD(1)$. Using $M_{D1}$, the reference model output $y_M(2)$ is offset to allow a direct measurement of $d_2$ according to equation (8). Similarly, for computing $d_3$ in the next instant, a model $M_{D2}$ of the loop for $d_2$ will be required, and so on.

The entire algorithm can now be outlined. For the current k:

1. Compute the disturbance step $d_k$:

$$d_k = z(k) - \left( y_M(k) + \sum_{i=0}^{k-1} z_{Di}(k) \right) \tag{9}$$

where $z(k)$ is the actual measured output of the system,
$y_M(k)$ is the reference model output,
$z_{Di}(k)$ is the output of the ith disturbance model, all at the instant k.

2. If $d_k=0$, then go to the end. Otherwise, synthesize the kth disturbance processor stage $D(k)$ according to the supervisor's specifications. The stages generally may have different transfer functions $D(k)$ for every k.

3. Compute the disturbance control sequence $u_{Dk}(n)$ for $n=0 \ldots, T_{sk}$ using the transfer function $$U_{Dk} = -\frac{D(k)}{1 + C \cdot D(k)} \cdot \frac{d_k}{(1 - z^{-1})} \tag{10}$$

The minus sign is a result of deriving FIG. 7 from FIG. 6. The settling time $T_{sk}$ is provided by the supervisor.

4. Compute the disturbance model sequence $z_{Dk}(n)$ for $n=0, \ldots, T_{sk}$ using the transfer function $$Z_{Dk} = \frac{1}{1 + C \cdot D(k)} \cdot \frac{d_k}{(1 - z^{-1})} \tag{11}$$

5. Compute the overall control value $$u(k) = u_R(k) + \sum_{i=0}^{k} u_{Di}(k) \tag{12}$$

Note that unlike in equation (9), the index i runs up to k because the controller is not a proper dynamic system, as the closed-loop model must be.

6. End of the $k^{th}$ iteration.

FIG. 10 depicts the actual implementation. Each disturbance processor stage, and the disturbance model stage as well, is no more complex than a stack of memory cells from which a new value is obtained for a new k. The stacks are set up, one at a time, when a new sample arrives. For a finite settling time $T_s$ (theoretically it need not be), the disturbance model stack is also finite with exactly $T_s$ elements, since after $T_s$ sampling periods the impact of the disturbance is erased. On the contrary, except for astatic systems (i.e., those having one or more integrators), the disturbance control sequence is always infinite. However, because after $T_s$ periods the disturbance closed loop reaches steady state, all control values $u_D$ (u) for $n \geq T_s$ are identical. Thus they can all be replaced by adding the steady-state value to an accumulator only once at $n=T_s$, thereby also reducing the stack size to $T_s$ elements. Being finite, all disturbance processor and model stages are eventually used up and disposed of, and their hardware resources become available for newly created stages. While running, the controller appears to be cycling around the available stack hardware, which gave it its name.

Synthesizing two processor stages and their accompanying models every sampling period may seem to be computationally burdensome. Actually, for time-invariant systems, the control and model sequences can be precomputed and downloaded into the controller, reducing its run-time computational demands to a fraction of the original volume. Furthermore, if both processors are known to be operating only in the fixed-duration mode, the general scheme explained above can be implemented without the cycling.

It should also be noted that the disturbance processor can be actively robust. Active robustness is what we call a method for maintaining the performance of model based control when the plant model used by the controller becomes increasingly inaccurate because of the drift in a plant's parameters.

A plant can be defined by the transfer function, $G=B/A$. The transfer function of the plant at the time that it is identified, is called the nominal model and can be denoted by the equation, $G_0=B0/A0$.

A plant whose parameters have drifted from the nominal plant can be defined by the equation, $$G = \frac{B_0 + \Delta B}{A_0 + \Delta A},$$

where $\Delta A$ and $\Delta B$ represent the change from the nominal model.

FIG. 24 shows that the mismatch between the nominal model, as employed by the controller, and the actual plant can be modeled as a virtual disturbance acting on the nominal plant along with a real disturbance. The virtual disturbance is error in a portion of the output that is caused by a mismatch between the physical plant and the controller's model of the plant. This type of error is usually quite small, but can change as the plants operating characteristics change. (Usually this is the result of aging effects, etc. In rare instances of catastrophic failure in some part of the system, the virtual error will be quite large. The preferred embodiment takes care of these situations as well.)

The real disturbance, on the other hand, is caused by something other then a mismatch between the plant and its model, usually an external force acting on the plant.

This type of error is usually larger then the virtual error, and more likely to be subject to extreme changes.

Neither conventional nor predictive controllers alone generally can distinguish between the two kinds of disturbances. Consequently, both types of disturbances are rejected using the same control law, regardless of the fact that they usually have quite different spectral properties. As seen in this figure, the virtual disturbance comes out of a filter with dynamics close to that of the model $G_0$. If the plant input, u, undergoes a step change, then the resulting virtual disturbance will be the filter's step response with a slow take off (rise) during the first few samples. This is different from real disturbances, where the take off will not typically be small and slow in rising. If a fast corrective action is taken and initiated at the first sampling instant following the change, then the disturbance can be suppressed before it has enough time to grow large. This would call for the disturbance processor to work in a fixed duration, or time optimal, control mode. However, a fixed duration disturbance processor is not always best suited for this role because it can produce violent control actions that are unacceptable in many applications.

In the preferred embodiment, this is resolved by having two disturbance processors customized for their tasks: one for real disturbances and another for virtual disturbances. This allows the real disturbance processor to employ any user defined control law, while the virtual disturbance processor employs a fixed duration control law. If this choice is made, a disturbance can then be classified as a real or virtual disturbance based on its amplitude and the controller will always apply the appropriate control law. In the preferred embodiment, this threshold is typically set at 1% of the plant output range. Such "active robustness" is not available in a system that doesn't have separate processors.

DESIGNING THE REFERENCE PROCESSOR R

Designing the reference processor R is a much simpler task than designing the disturbance processor D because the processor R works open loop. As in FIG. 4, the reference input W is broken down into a sequence of the step functions. For each step, a new reference processor and model stages are synthesized according to the supervisor's instructions. Both the processor R and the reference model $M_R$ are also implemented using reusable stacks.

DESIGNING THE SUPERVISOR S

As explained above, the supervisor S prevents unwanted processor cooperation by keeping track of the active processor stages, assessing their contributions at every instant by means of the predictive models of their influence and by correctly estimating the actual disturbance changes, which otherwise are not directly measurable. This must be done for both processors R and D and must work correctly, even if the reference and load/disturbances are changing simultaneously.

Another task of the supervisor is to specify proper control actions at every sampling instant, and possibly other parameters required for stage synthesis, when the user chooses the fixed-rate control law. To illustrate this problem, it is assumed that the user wants the reference to be processed with a fixed rate equal to 1. The reference time profile is shown in FIG. 11. At k=0, the reference step $w_0 = +20$ will require the settling time $$T_{s0} = \frac{w0}{\text{rate}} = 20 \qquad (12)$$

sampling periods, provided that the response is a linear ramp. However, before the transient process is completed, another reference change $w_{10} = +20$ takes place. If processed immediately with the same rate, the total output rate between k=10 and k=20 would be 2, thus violating the user's specification. Obviously, in this case the processing of step $w_{10}$ must be postponed until k=20 because, until then, there is no available "unused" rate.

On the other hand, if $w_{10}$ were −40 (see FIG. 12), the available rate at k=10 would be −2, since $|1-2|=1$, and this value should be used to produce the fastest response within the user's limits. At this rate, the processing of $w_{10}$ will also require 20 sampling periods. Between k=10 and k=20, the output response is being slowed to a rate of −1, since the first stage is still active. However, as the first stage ceases at k=20, the response will accelerate to the full −2 rate.

Although simple, this example illustrates that when synthesizing a new processor stage, the supervisor S cannot decide merely on the basis of the current situation. It must also take into account the consequences of intended actions within a planning horizon that spans the expected settling time interval. The difficulty of planning is further aggravated by two factors. Unlike in our example, in real-world applications the number of active stages is usually greater than one. Second, transient responses need not be linear ramps featuring a constant rate. On the contrary, a typical transient response of the closed loop has a variable rate ranging from negative to positive values. Although this does not make planning impossible, it does complicate it. Moreover, it puts additional strain on the supervisor's ability to synthesize the processor stages so that they generate responses that fit into the existing rate constraints.

We have investigated two approaches to planning. The opportunistic planning originally used is based on the philosophy of fixing existing problems and leaving potential problems to be solved in the future. In this approach, the available rate at the current instant is calculated by first summing the rates of all active processor stages except those that are going to die out at that instant. Next the difference between this "active" rate and the user-specified rate is found, with the error step sign taken into account. Then a processor stage producing an appropriate linear ramp response is synthesized. Because such planning is strictly local, it often happens that when one or more currently active stages cease, the rate suddenly jumps above the user-specified value, as in FIG. 12. To slow the output, the supervisor S makes a quick fix by producing a dummy reference change. When the critical period is over, another dummy reference change with the opposite sign is issued to avoid introducing a steady-state error.

Although opportunistic planning is computationally simple, due to the local, shortsighted planning strategy, it is not optimal. It would be even less efficient if the processor's responses were not ramps. The strategy used in the current controller version is strategic planning because it considers the entire planning horizon in proposing a corrective action that takes full advantage of available rates within the settling time interval. Of course, the correction responses are no longer ramps.

Alternately, this predictive control scheme can be explained by comparing it with linear control. For a linear plant, the overall closed loop response can be thought of as the sum of the responses $y^0(t)$, $y^k(t)$ to two control sequences (where $y^0(t)$ is the current output sequence $y^k(t)$ is the correction output sequence. These two control sequences can be defined as:

$$u^0(0), u^0(1), \ldots, u^0(k-1), u^0(k), u^0(k+1), \ldots 0, 0, \ldots$$
$$\ldots 0, u^k(0), u^k(1), \ldots$$

(where the sequence $u^k(n-k)$, where $n=0,1,\ldots$, can be interpreted as a correction added to $u^0(n), n=0,1,\ldots$, starting at time k.) The sum of these control sequences corresponds to the reference steps $r^0(n)=r^0, r^k(n-k)=r^k, n=0,1,2, \ldots$. The sequences $y^0(n)$ and $y^k(n-k), n=0,1,\ldots$, are obtained by sampling $y^0(t)$ and $y^k(t)$. Similarly, $u^0(n)$ is called the current control sequence and $u^k(n-k), n=0,1,\ldots$, is called the correction control sequence.

Looking at FIG. 25, in the linear controlled plant (not what this invention addresses), the correction output sequence is a copy of the closed loop unit step response $h(n)$ scaled by the reference or set point change magnitude $r^k$ and delayed by k sampling periods or cycles $$y^k(n-k)=r^k \cdot h(n-k), n=0,1,\ldots$$

with $$h(i)=0 \text{ for } i<0.$$

In other words, in order to determine $y^k(n-k), n=0,1, \ldots$, the knowledge of the desired output is not needed.

This fact enables the linear controller to compute the corrected control value at time n:

$$u^0(n)+u^k(n-k),$$

directly using its transfer function and the current control error, without having to explicitly determine the correction sequences $$y^k(n-k), u^k(n-k), n=0,1,\ldots$$

Linear control is quite different from predictive control, where the correction output sequence $y^k(n-k)$ can consist of any user defined values which depend on both the current and desired responses. At the current time k, when the first element $u^k(0)$ of the correction control sequence is to be applied, the future values of $y(n)$ needed for determining $u^k(0)$ have not yet been observed, thus making it impossible for feedback alone to implement the attempted control law. One way to overcome this is to provide the controller with an internal model of the closed loop path as it exists at time k and let it run ahead of the current time while assuming that there will not be a change in the reference at time k or any time thereafter. Requiring the model to be that of the closed loop and not merely of the plant (which is the case in most other predictive control schemes), allows this inventive approach to successfully control not only stable plants, but also unstable plants with any number of unstable poles. (A pole is located at those locations that cause the denominator of an irreducible solution to equal zero).

Once the correction output sequence $y^k(n-k)$, $n=0,1,\ldots$ is determined, the next step is to find a correction control sequence $u^k(n-k), n=0,1,\ldots$ which, if applied to the plant separately, would cause it to follow the sequence $y^k(n-k), n=0,1,\ldots$ as closely as possible. Since the plant dynamics usually prevents the perfect production of $y^k(\cdot)$, its best least mean square approximation is sought. Other calculations could be used, as will be apparent to those of ordinary skill in this art, but the best mean square approximation is presently preferred. A useful formulation of the resulting optimization problem requires some additional constraints be considered as shown below.

The predictive control procedure used by all the processors in the preferred embodiment, shown in FIG. 26, consists of the following steps.

1) Predict the current output sequence. Using the past and precomputed future values of the current control sequence:

$$u^0(k-d), \ldots, \ldots u^0(k), \ldots u^0(k+P-1) \quad (2.1)$$

where k is the current sampling instant $P>=P_0$ is an integer called the prediction horizon whose minimum length $P_0$ is determined by an optimization algorithm in Step 4 (which must be precomputed at start up).

$d>=0$ is the plant transportation delay (if any) and a model of the plant under control, compute the future values of the current output sequence $$y^0(k+1), \ldots, y^0(k+P+d) \quad (2.2)$$

2) Compute the desired output sequence.

Using the current output $y(k)$, the reference change value $r^k$ and the adopted control law (fixed rate, fixed duration or other user defined law), compute the future desired output sequence.

$$y(k+1), \ldots, y(k+P+d) \quad (2.3)$$

where:

$y(n)$ is the desired output sequence generated in step 2

$y^0(n)$ is the computed future value output sequence from step 1

3) Determine the ideal correction output sequence as follows.

$$y^k(n-k)=y(n)-y^0(n) \quad n=k+1, \ldots, k+P+d \quad (2.4)$$

(Note that $y^k(0)=0$ because $y(k)=y^0(k)$.)

4) Find the correction control sequence. Find $u^k(n), n=0,1, \ldots$ so that the following three criteria are met:

a) The sub-sequence $y^k(n), n=0,1, \ldots, P-1$ minimizes the performance criterion (J) as follows:

$$J(u^k(0), \ldots, u^k(P-1)) = \quad (2.5)$$
$$(1-w) \sum_{i=1}^{P} (Y_A^K(i+d) - Y^K(i+d))^2 + w \sum_{i=0}^{P-1} (\Delta U^K(i))$$

where $$y^k{}_A(n) = \sum_{i=0}^{n} h(i) u^k(n-i) \quad (2.6)$$

is the actual (A) instead of the ideal correction output sequence, $h(n), n=0,1 \ldots$ is the plant model impulse response, $$\Delta u^k(n) = u^k(n) - u^k(n-1), n=0,1,\ldots \text{ with } u^k(-1)=0 \quad (2.7)$$

where $0 <= w <= 1$ is a trade off between the accuracy of following the ideal correction output sequence and its cost in terms of the control signal smoothness.

Note that because the stability issues in 4c (below) are separated from the criterion formulation (2.5), any choice for the value of w, will lead to a stable correction. This is not true for dynamic matrix control (as shown by Cutler, C. R. and Ramaker, B. L. in "Dynamic Matrix Control—A computer Control Algorithm", IACC San Francisco, 1980) and some other methods. If w=0, then the best approximation of the ideal correction output is found, resulting in the best control quality. However, the cost in terms of large and possibly irregular oscillating control actions can be substantial, particularly for short prediction horizons. On the other hand, for w=1, the correction control sequence is the smoothest possible, letting the plant make the smoothest transition and reach the steady state in P steps. By choosing a value between 0 and 1 the user can set a trade-off between the control quality and the actuator stress depending on what value is best suited for a given application.

Please note that J can be any criterion equation selected by the user as optimal. Such as, for example, the minimum integral square error, minimum integral absolute error, or others, as is well known to users of the relevant prior art. However, in the preferred embodiment, we have described the use of the criterion equation that is used in equation 2.5.

b) The sequence $u^k(n), n=0,1,\ldots$ produces a P-step deadbeat output sequence. This process output sequence is $y^kA(n), n=0,1,\ldots$ with $$y^kA(n) = y^k(P+d) \text{ for all } n \geq P+d \quad (2.8)$$

P-step deadbeat means that the plant will remain stable after leaving the prediction horizon.

c) The sequence $u^k(n), n=0,1,\ldots$ is generated by a stabilizing controller for the given plant in response to the step reference change $r^k(n) = r^k, n=0,1,\ldots$. It implies that $y^kA(n), n=0,1,\ldots$ can be interpreted as the step response of a closed loop driven stably by a linear controller.

5) Correct the current control sequence. Compute the correct control sequence $$u(k+n) = u^0(k+n) + u^k(n), n=0,1,\ldots \quad (2.9)$$

6) Apply the current control value u(k) to the network plant or summation means.

7) Proceed to the next sampling instant as follows. Set $$u^0(n) = u(n), n=k, k+1, \ldots \quad (2.10)$$

Then proceed to the next sampling instant (k+1) where the above described procedure is repeated.

For ease of understanding this seven-step sequence can be shown graphically. FIG. 30 graphically shows how the current output sequence is predicted. This figure shows the current control sequence 301, plant 302 and future current output sequence 303 as it exists at time=k. Past and pre-computed future values of the current control sequence 301 and a plant model 302 are used to compute future values of the current output sequence 303.

FIG. 31 graphically shows how the desired output sequence is determined. In this figure, the adopted user defined control law 313 uses the current output at time K and the reference change at time K to generate a sequence of signals that the user would like the plant to produce. In this figure, the current output from the plant 311 and the change of the reference value 312, along with the adopted control law 313, are used to determine the future desired output sequence 314.

FIG. 32 graphically depicts how the ideal correction output sequence is determined. In this step, the difference between the future desired output 314 and the future actual output 303 are used to determine the ideal correction output 323. It should be noted that the future desired output sequence 314 was generated in step two of this process, while the future actual output sequence 303 was generated in step one of this sequence.

Step four of this sequence is shown in FIG. 33, which graphically depicts how the correction control sequence is determined. In this figure, it is shown that the ideal correction output sequence 323 which was generated in step 3, is used to generate the correction control sequence 331. This is accomplished mathematically through the optimization procedure 341 described in step 4.

FIG. 34 graphically describes step five, where the current control sequence is determined. This is accomplished by adding the correction control sequence 331 with the current control sequence 301. It should be noted that the correction control sequence 331 was determined in step four of this procedure, while the current control sequence 301 was available from the last iteration (i.e., sampling period) of the controller. This correcting control sequence 341 is then sent to the plant in order to control it in step six of this procedure, and also stored in the controller for use in the next iteration (i.e., sampling period).

Looking at FIG. 30, the effects of step seven become clear. In step seven, each value of the current control sequence 301 is shifted to the left. The value that was originally at time k−d is thus deleted, and a new value at time k+P−1 is now generated. Control of the plant is accomplished, repeating this procedure indefinitely.

Looking at FIG. 29, we see the obvious differences between the seven-step as above forementioned procedure and how a linear controller operates. In FIG. 29, the current control value 291 is added to the correction control value 292 to obtain the corrective control value 293. The corrective control value 293 is then sent to the plant for corrections. It should be noted that in the linear controller, each one of the values of each control sequence is generated at a specific time. No values are precomputed. Thus, in the linear controller, only one value of each control sequence exists at any one time.

It should be noted that the processing units or processors may be constructed by causing a computer to proceed step by step through the above-described process. Such a construction can be called a software processor. These processors can alternatively be constructed in hardware, or some combination of hardware or software, as is well known to practitioners of the relevant art.

The ability of the above seven-step predictive control formulation to run on software and hardware processors also allows several different processors to divide up the tasks or process the steps in parallel. This allows the controller to be configured in different combinations, which give the controller the ability to be highly adaptive and achieve better performance. The location of storage devices via-a-vis the processors is a matter of design choice.

For instance, one such implementation would have the reference processor and the feedforward path model operated by and located on one processor, the disturbance processor and the disturbance feedback loop model on another processor, while the active robustness processor and the active robustness feedback loop model would be on a third processor. The limit supervisor could then be located on a fourth processor. Another implementation would have the reference processor, disturbance processor and active robustness processor located on one processor, the active robustness feedback loop model, disturbance feedback loop model and feedforward path model are located on another processor, while the limit supervisor is located on its own processor. A third implementation would have the entire controller located on one processor. These are just some examples of possible combinations. Several other combinations are possible, as it is well known to practitioners of the relevant art.

When portions of this controller are located on an operated by different processors, the controller is said to be distributed. In distributed environments, the data storage may be all located together or dispersed for rapid access by individual processors as desired. The controller is able to operate in a distributed environment as a direct result of the seven-step predictive control formulation. As is obvious to one skilled in the art, portions of the seven-step formulation need not be run sequentially. Therefore, these steps can be executed concurrently by different portions of the multiprocessor controller, or a pipelined operation of the controller could be employed.

In the preferred embodiment, several of the processes that are undertaken operate in a parallel like manner. For example, in step two where the desired output sequence is computed, two inputs, the current output and the reference change are used to compute several future desired outputs. Another example of parallelism is in step three where the ideal correction output sequence is determined. In this step, the values of one series are subtracted from the values of another series to generate a third series. Another example of parallelism is in step one of the seven step above forementioned procedure, where the current control sequence 301 is passed through the plant 302 to generate the future current output sequence. Because of this parallelism, processors can continue to run ahead while earlier generated data is utilized by other steps of this procedure.

The ability of the controller to run in a distributed environment gives three distinct advantages. First, the controller is more reliable. For example, if we have a controller in which the disturbance processor and active robustness processor are located on two separate processors and the active robustness processor fails, the system will continue to function. A second advantage of having the controller in a distributed environment is performance. The seven-step predictive formulation can be run quicker in a distributed environment than in a nondistributed environment. Finally, it is easier to locate a distributed controller. For instance, a controller that is distributed may have different components located throughout an entire plant. The reference processor and feedforward path models can be located near the control center, while the disturbance processor, active robustness processor and limit supervisor can be located near the plant. This allows more efficient use of plant space.

The above seven-step formulation of predictive control differs from other known schemes in several respects including control stability. If we assume that (2.1) is a sub-sequence of the current control sequence which provides a stable control of a given plant, then the current and future values, $u^0(k)$, $u^0(k+1)$, ..., in (2.1) would have been generated by the predictive controller if there was no reference change at times k,k+1, .... The output sequence (2.2) is called the closed loop prediction. The underlying assumption implies that the predictive controller as it existed at time k would guarantee a closed loop which is stable both internally and externally. (Internal stability means that the controller itself will not produce unstable control sequences. While external stability means that the controller will keep the plant stable, not necessarily by means of a stable control sequence.) The correction procedure will not destroy this stability, because this procedure, disclosed in its preferred 7 step formulation above, corrects the current control sequence by adding a correction control sequence which is by design stable regardless of the plant stability status primarily because of step 4c. The closed loop response will also remain stable after the predictive controller behavior has been modified.

This is different from most predictive schemes in which equation (2.1) is replaced by the open loop prediction in which future control values are set to the current control u(k):

$$u^0(n) = u^0(k), n > k$$

This would mean that the predicted current output sequence (2.2) would become the plant step response executed with nonzero initial conditions. If the plant is unstable, even a stable correction based on this prediction could destabilize the closed loop. Consequently, none of the popular predictive control schemes are able to provide provably stable control for an arbitrary unstable plant.

The closed loop prediction method employed by this invention is costly in at least one way. In the present invention, the future values of the current control sequence must be stored and updated at every sampling instant. An open loop predictive system, on the other hand, does not need to recompute the entire control sequence.

This leads to the question of just how many future values need to be maintained at any given instant. Although the sub-sequence (2.1) at any instant makes use of only (P−1) future values, this "window" of sampling instants is constantly moving forward in time. Consequently, the correction (2.9) calls for updating the control sequence to infinity. One solution implemented in the presently preferred embodiment, is to require the correction sequence to reach a steady-state after a finite (and rather small) number of sampling instants. Once the initial transient is exhausted, the same steady-state value is used from that instant forward. Because this requirement is independent of the conditions listed in Step 4, we will now add it here.

d. The sequence $u^k(n)$, n=0,1, ... is P-step Deadbeat

This means that $$u^k(i) = u^k(P) \text{ for all } i >= P \qquad (2.11)$$

It is preferred to consider this requirement an option. This option is a particularly important one to use given the fact that (2.11) can produce unsatisfactory closed loop responses for some plants. Alternate formulations not insisting on P-step deadbeatness are possible but we shall not explore them here.

It is important to note another difference between previously known predictive schemes and this invention's procedure. That is the condition set forth in 4c. Requiring the corrective sequence at any instant k to be, in principle, producible by a linear feedback controller does not imply that the resulting predictive controller is linear. The constraint merely confines the search for solutions of the optimization problem (2.5) to all possible stable controls of the given plant.

All predictive schemes use approximately deadbeat corrections to ensure the correction response (the plant output) does not become wild as soon as it leaves the prediction horizon. This is accomplished by tuning the controller parameters, particularly the length of the prediction horizon. In this invention, the deadbeatness of the correction output sequence is explicitly required and is detached from stability. As a result, stability is not related to the length of the prediction horizon which can be chosen arbitrarily to meet the fixed rate or fixed duration law.

The SISO ROC can be used to control any stable or unstable plant, with or without transportation delay. In the preferred embodiment the rate and duration are on-line parameters very much like the reference, and can be changed at any time. This allows the user to determine the way a state will be reached in real time.

A supervisory or data sharing system can also be implemented to oversee the operation of the controller. Various operations of the controller can be overseen in different ways. First, in each of the processors, a supervisor can check each sequence value to make sure that no user defined criteria has been violated. For example, if one of the elements of a sequence violates a user defined upper limit, the supervisor can scale the entire sequence down, so that the individual control value will no longer be in violation. Secondly, a supervisor can also be employed to monitor the change of a control value from one sequence to the next. This is done to ensure that no user defined limit on the rate of change of the manipulated variable will be exceeded.

Supervisory functions can also be employed to assure that the combination of signals from the reference and disturbance processor will not cause the plant to exceed the user defined values or rates. If the combination of the two sequences will cause the plant to exceed the user defined limits, each element of the combination of the two sequences that is sent to the plant can be scaled down by the same factor, until the excessive situation is corrected. Note that a simple clamping of those control values that exceed the limits may be considered for predictive control algorithms, however, it is not used here because it may turn an originally stabilizing control sequence into a destabilizing one.

In FIG. 28, an example of this procedure is shown by graphically representing two sequences of control values. We have connected the points together to enhance the heuristic value. In this case the original control sequence (A,B,C,D,E,F,G) violates a user defined absolute limit because element D violates the lower control limit. The supervisor generates a new sequence (A',B',C',D',E',F',G') which is a scaled down version of the original sequence. In the new sequence, D' no longer exceeds the lower control limit.

Although this example dealt with a fixed control limit, a similar scaling procedure can be performed on a sequence in which the difference between one element and another violates a user defined condition. For instance, a plant's actuators may not be able to make large changes in small time periods. Therefor, the user could say that at any given time period, the change from one control level to another shall not exceed 60 units. Again, looking at FIG. 28, we would see that the control sequence (A,B,C,D,E,F,G,H) would violate this law twice. Once, when going from A to B, and again when going from E to F. Because of these violations the supervisor generates a new sequence (A',B',C',D',E',F',G') which is a scaled down version of the original sequence. In the new sequence, the two new transitions A' to B' and E' to F' no longer violate the control law.

In the preferred embodiment, these supervisory functions would be performed in step six. Looking at the controller, there are two different ways that these can be implemented in the plant. The first way is shown in FIG. 26. One will note that the limit supervisor, 104, performs those functions that are previously described as supervisory functions. The other method is shown in FIG. 27 where the supervisory functions are split between two units; the reference processor summation unit 130 and the active robustness processor summation unit 131. Although we have discussed two ways of implementing these functions, there are several other ways to do this that are obvious to one skilled in the art.

TEST RESULTS

In this section, test results are presented to illustrate how the cycling controller copes with the reference and load changes and its robustness regarding drift of the controlled system parameters. In the following discussion, system 1 and system 2 refer to the controlled systems with the transfer functions $$S_1(s) = \frac{10}{s \cdot (2s + 1) \cdot (0.2s + 1)}$$

and $$S_2(s) = \frac{10}{(5s + 1) \cdot (2s + 1) \cdot (s + 1)}$$

respectively. The sampling period was 0.1 sec. No sample-and-hold device was used.

FIG. 13 presents data demonstrating the two basic modes of operation of the cycling controller as introduced earlier in FIG. 2. The plot on the top shows the transient responses of system 1 to two reference steps, w=10 and w=40, when the reference processor operated in the fixed-duration mode with settling time $T_s=10$. The disturbance processor also operated in the fixed-duration mode set to "time optimal." If the user selects this option, the controller automatically finds the shortest feasible settling time and synthesizes appropriate control to eliminate the effects of load/disturbance changes in a time-optimal way. For both systems, the time-optimal settling time happened to be four sampling periods. In the bottom plot of FIG. 13, the reference processor operated in the fixed-rate mode with rate=1.

FIG. 14 shows how the cycling controller handles the reference changes discussed in connection with FIGS. 11 and 12. For comparison, the bottom is a similar plot for a digital linear controller with settling time $T_s=20$.

FIGS. 15 and 16 depict how load changes of +20 and −20 units (i.e., 100 percent of the nominal steady-state output) are compensated for. The changes take place at $k=10$ while the system is still responding at rate=1 to the reference step w=+20 made at k=0. The plots on the top illustrate that within the optimal settling time $T_s=4$, the fixed-duration disturbance processor gets the controlled system back on track. In another option, the controller can coordinate the reference and disturbance processors so that the overall rate of change of the controlled variable is maintained at the user-specified level, regardless of what initiated the control actions. The plots in the middle demonstrate this mode of operation. For comparison, the plots on the bottom are responses of a conventional digital linear controller with settling time $T_s=20$.

FIG. 17, which is similar to FIGS. 15 and 16, highlights the differences between the cycling and linear controllers in coping with load changes. The changes applied at k=10 were −20, −10, +5, +10 and +20 units.

FIG. 18 compares the cycling and analog PID controllers. The reference processor operated in the fixed-duration mode with settling time $T_s=61$ to model as closely as possible the dynamics of the PID-controlled closed loop. The PID was set up according to the ITAE criterion.

Control systems with cycling controllers as disclosed herein exhibit robustness that cannot be matched by conventional-output or state-feedback controllers. This is a result of the tight feedback applied by the disturbance processor along the entire transient, whose expected shape is computed by the controller's processors. The models enable the processors to detect the slightest deviations from the expected path and immediately initiate a corrective action before they grow too large. On the contrary, in conventional control systems only the transient's steady-state value can be under feedback control, since nothing else is known about it. The particular shape of the transient is molded implicitly by choosing suitable closed-loop parameters, which inevitably makes the systems vulnerable to parameter drifts. At best, conventional systems can only provide passive robustness to parameter drifts, as opposed to the active approach to suppressing the effects of disturbances in systems built with cycling controllers.

In the remaining figures, both system 1 and system 2 were subject to the following parameter drifts:
Alternative 1, no change;
Alternative 2, dominant time constant increased by 20 percent;
Alternative 3, dominant time constant decreased by 20 percent;
Alternative 4, gain increased by 20 percent;
Alternative 5, gain decreased by 20 percent.

FIGS. 19 and 20 compare the variations of transient responses for cycling and linear controllers. The plots on the top do not represent a single curve but an overlay of all five responses. Even in the enlarged drawings in FIGS. 21 and 22, it is difficult to notice any differences. For comparison, a PID set up according to the ITAE criterion produced the responses in FIG. 23.

CONCLUSIONS

The major advantage of cycling controllers as disclosed herein over conventional controllers is that they separate the processing of reference and load/disturbance changes. This gives the designer the option to choose their control laws arbitrarily. Moreover, the internal structure of the controllers easily accommodates nonlinear operations like decision making and demands on time-variable dynamical characteristics of the closed loop. This considerably extends the capabilities of the controllers beyond the limits of conventional-output or state-feedback control systems.

In accordance with the invention herein, a fixed-rate controller for electric utilities was designed. Computer simulations have shown that the controller is capable of maintaining the user-specified rate of change of the controlled variable for both the reference and load changes, and exhibits excellent robustness with respect to the drifts of controlled system parameters.

REFERENCE

Mayers, K. W., et al. "Controls for the Future—A Development Program." 2nd International EPRI Conference, Palo Alto, November 1988.

Cutler, C. R., Ramaker, B. L. "Dynamic Matrix Control—A computer Control Algorithm", IACC, San Francisco, 1980.

It is claimed:

1. A controller unit for controlling a plant comprising,
a reference processor having a reference input means for receiving a reference signal and being operable to generate a baseline control signal which can bring said plant into a desired state along a definite user defined path,
a reference model having a reference model identifying the system through the use of a transfer function for generating and outputting a signal representing the expected output of said plant at any instant along said user defined path,
a disturbance processor having an input for receiving error signals and being operable to generate and send corrective control signals,
each of said processors having an operating mode which is pursuant to either a fixed duration control law or a fixed rate control law, and
supervisor means for controlling maximum acceptable rate limits, connected to receive signals from and send signals to each of said reference processor, reference model, and disturbance processor so that said limits are not exceeded; and wherein said reference model further comprises:
a feedforward path model of the plant under control, receiving as input a user defined set point, and generating and outputting a signal representing the expected output of said plant at that particular time instant, and
a feedback loop model, receiving an input from a disturbance model and generating and outputting a signal representing the expected effect $U_D$ will have on the plant, and
a means for outputting the result of the combination of the output of the feedforward model and the feedback loop model to the disturbance processor.

2. A controller unit for controlling a plant as in claim 1, wherein the result of the combination of the output of the feedforward model and the feedback loop model are further combined with plant output signals before being provided to the disturbance processor.

3. A computer system operable as a predictive controller for controlling a plant and connected to said plant either through direct electronic or optical link or via human machine interface comprising:

a reference processor having a reference input for receiving a reference signal, indicative of setpoint, and being responsive to the user controllable setpoint, which reference processor generates a sequence of baseline control signals which can bring said plant into a desired state, as indicated by an output signal from said plant, along a user defined path, a feedforward path model having an input which also receives said reference signal, being responsive to the user controllable set point to generate and output a sequence of signals representing the expected output of said plant at any instant along said user defined path, a disturbance processor having an input for receiving a sequence of error signals which represent the difference between the actual and the predicted plant output and for generating and outputting a sequence of corrective control signals based on a control law, an active robustness processor having an input also for receiving a sequence of error signals which represent the difference between the actual and the predicted plant output, and for generating and outputting a sequence of corrective control signals based on the input of said received sequence of error signals and its control law, a disturbance feedback loop model having an input for receiving the sequence of error signals received by said disturbance processor and being operable to generate and output a sequence of signals representing disturbances that the disturbance processor has already processed, an active robustness feedback loop model having an input for receiving the sequence of error signals received by said active robustness processor and being operable to generate and output a sequence of signals representing disturbances that the active robustness processor has already processed, a disturbance feedback loop model summation unit having an input to receive the output sequence from the active robustness feedback loop model and the disturbance feedback loop model and an output means for producing an output sequence consisting of the element wise summation of the two input sequences, a reference model summation unit having an input to receive the output sequence from the disturbance feedback loop model summation unit and the feedforward path model and an output means for producing an output sequence consisting of the element wise summation of the two input sequences, a disturbance processor difference unit having an input to receive a sequence of signals from the reference model summation unit and an input to receive the output from the plant, and an output means to produce an output sequence consisting of the difference between the first term of the sequence and the plant output, a disturbance switching decision unit having; an input for receiving the output from the disturbance processor summation unit, a comparison means for comparing the level of the disturbance to a user defined level, and a switching means that outputs the received signal to either the disturbance processor or the active robustness processor, based on the signal comparison, a reference processor summation unit having inputs to receive the output sequence from the reference processor and of the disturbance processor and an output for producing a sequence consisting of the element wise summation of the two input sequences, an active robustness summation unit having an inputs to receive the output sequence from the reference processor summation unit and of the active robustness disturbance processor and an output for producing an output sequence consisting of the element wise summation of the two input sequences, wherein said feedback loop model, active robustness feedback loop model, disturbance processor and active robustness processor obtain their inputs from the disturbance processor summation unit.

4. A computer system operable as a predictive controller as set forth in claim 3 which further comprises:

a limit checking supervisor having an input to receive the output sequence from the active robustness summation unit processor and an output for producing an output sequence in which none of the elements in said sequence violate user defined limits.

5. A computer system operable as a predictive controller as set forth in claim 3 which further comprises:

a limit checking supervisor having an input to receive the output sequence from the active robustness summation unit processor and an output for producing an output sequence in which none of the combination of elements in said sequence violate user defined limits.

6. A computer system operable as a predictive controller as set forth in claim 3 wherein the reference processor summation unit and the active robustness summation unit include:

a limit checking supervisor that regulates the output sequence to ensure that none of the elements in said sequence violate user defined limits.

7. A computer system operable as a predictive controller as set forth in claim 3 wherein the reference processor summation unit and the active robustness summation unit include:

a limit checking supervisor that regulates the output sequence to ensure that none of the combination of elements in said sequence violate user defined limits.

8. A computer system operable as a predictive controller for controlling a plant and connected to said plant either through direct electronic or optical link or via human machine interface comprising:

a reference processor having a reference input for receiving a reference signal, indicative of setpoint, and being responsive to the user controlled set point to generate a sequence of baseline control signals which can bring said plant into a desired state as indicated by its output signal, along a user defined path, a feedforward path model having an input which also receives said reference signal, being responsive to the user controlled set point to generate and output a sequence of signals representing the expected output of said plant at any instant along said user defined path, a disturbance processor having an input for receiving a sequence of error signals which represent the difference between the actual and the predicted plant output and for generating and outputting a sequence of corrective control signals based on a control law, a feedback loop model having an input for receiving a sequence of error signals representing the difference between the actual and predicted plant output and being operable to generate and output a sequence of signals representing disturbances that the disturbance processor has already processed, a reference model summation unit having an input to receive the output sequence from the feedback loop model and the feedforward path model and an output means for producing an output sequence consisting of the element wise summation of the two input sequences, a disturbance processor summation unit having an input to receive a sequence of signals from the reference model summation unit and an input to receive the output from the plant, and an output means to produce an output sequence consisting of the difference between the sequence and the plant output, a reference processor summation unit having an input to receive the output sequence from the reference processor and the disturbance processor and an output for producing an output sequence consisting of the element wise summation of the two input sequences, wherein said feedback loop model and disturbance processor obtain their inputs from the disturbance processor summation unit.

9. A controller unit according to claim 8 wherein said reference processor summation unit reduces each term of the output sequence by the same proportion when one of the elements exceeds a user defined limit.

10. A controller unit according to claim 8 wherein said reference processor summation unit reduces each term of the output sequence by the same proportion when the change between one element and another exceeds a user defined limit.

11. A controller unit according to claim 8 wherein said reference processor summation unit reduces each term of the disturbance processor output sequence by the same proportion when one or more of the elements when added with the reference processor sequence would exceed a user defined limit.

12. A controller unit according to claim 8 wherein said reference processor summation unit reduces each term of the disturbance processor output sequence by the same proportion when the change between any element and another when added with the reference processor sequence would exceed a user defined limit.

13. A controller unit according to claim 8 wherein said reference processor summation unit reduces each term of the reference processor output sequence by the same proportion when one or more of the elements when added with the disturbance processor sequence would exceed a user defined limit.

14. A controller unit according to claim 8 wherein said reference processor summation unit reduces each term of the reference processor output sequence by the same proportion when the change between any element and another when added with the disturbance processor sequence would exceed a user defined limit.

15. A method for controlling a plant using a controller unit for controlling a plant wherein said controller unit has:

a reference processor having a reference input means for receiving a reference signal and being operable to generate a baseline control signal which can bring said plant into a desired state along a definite user defined path, a reference model for generating and outputting a signal representing the expected output of said plant at any instant along said path, a disturbance processor having an input for receiving error signals and being operable to generate and output corrective control signals according to a user defined control law, each of said processors having an operating mode which is user defined, and wherein said method for controlling said plant employs a method for coordinating the operation of said processors, comprising the steps of:

(A) first:
(i) defining a reference model which identifies the plant, and
(ii) selecting a user defined control law for the reference processor and the disturbance processor or a global law for both, (B) then in any order:
(i) allowing the user to adjust the setpoint,
(ii) generating a baseline reference control signal ($U_R$) through a processor unit obeying said control law,
(iii) generating a disturbance corrective signal ($U_D$) through a processor unit based on the deviation between the output from the plant and the expected output as generated by the reference model, but not including disturbances which have already had a corrective signal generated for them,
(iv) then combining $U_R$ and $U_D$ to produce a control signal for said plant so that the control law(s) selected for the disturbance processor and the reference processor or the global control law for the plant are not violated.

16. A method as recited in claim 15, for controlling a plant which further comprises:
(A) reducing $U_R$ to user defined maximum and minimum control values when said maximum or minimum control values are violated;
(B) reducing $U_R$ to user defined maximum and minimum control rates of change when said maximum or minimum control rates of change are violated.

17. A method as recited in claim 15, for controlling a plant which further comprises:
(A) reducing $U_D$ to user defined maximum and minimum control values when said maximum or minimum control values are violated;
(B) reducing $U_D$ to user defined maximum and minimum control rates of change when said maximum or minimum control rates of change are violated.

18. A method for controlling a plant using a controller as recited in claim 15 which further comprises the steps of:
(A) reducing the combination of $U_R$ and $U_D$ to the user defined maximum and minimum output values when said maximum or minimum values are violated;
(B) reducing the combination of $U_R$ and $U_D$ to the user defined maximum and minimum output rates of change, when said minimum or maximum rates are violated.

* * * * *